US 10,994,458 B2

(12) United States Patent
Kuroda

(10) Patent No.: US 10,994,458 B2
(45) Date of Patent: May 4, 2021

(54) METHOD FOR MANUFACTURING BALL JOINT AND METHOD FOR MANUFACTURING STABILIZER LINK

(71) Applicant: NHK Spring Co., Ltd., Kanagawa (JP)

(72) Inventor: Shigeru Kuroda, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 276 days.

(21) Appl. No.: 16/076,633

(22) PCT Filed: Feb. 8, 2017

(86) PCT No.: PCT/JP2017/004615
§ 371 (c)(1),
(2) Date: Aug. 8, 2018

(87) PCT Pub. No.: WO2017/138573
PCT Pub. Date: Aug. 17, 2017

(65) Prior Publication Data
US 2019/0047193 A1    Feb. 14, 2019

(30) Foreign Application Priority Data

Feb. 10, 2016 (JP) .............................. JP2016-023994

(51) Int. Cl.
*B29C 45/14* (2006.01)
*B60G 21/055* (2006.01)
(Continued)

(52) U.S. Cl.
CPC .. *B29C 45/14754* (2013.01); *B29C 45/14065* (2013.01); *B29C 45/1671* (2013.01);
(Continued)

(58) Field of Classification Search
None
See application file for complete search history.

(56) References Cited

U.S. PATENT DOCUMENTS 4,290,181 A * 9/1981 Jackson ............ B29C 45/14754
264/242
5,092,703 A * 3/1992 Kobayashi .............. B29C 45/14
403/122

(Continued)

FOREIGN PATENT DOCUMENTS

CN    101228018 A    7/2008
CN    105209771 A    12/2015
(Continued)

OTHER PUBLICATIONS

Chinese Office Action with Translation for Application No. 201780003943.1, dated Mar. 20, 2020.
(Continued)

*Primary Examiner* — Edmund H Lee
(74) *Attorney, Agent, or Firm* — Marshall, Gerstein & Borun LLP

(57) ABSTRACT

Provided is a method for manufacturing a ball joint including a ball-seat molding step for forming a ball seat assembly by using, as a core, a ball section of a ball stud, the ball section of which is integrally provided in advance at one end portion of a stud section, and insert-molding a ball seat made of resin to cover at least a portion of the ball section present on an opposite side to the stud section, and a housing molding step for insert-molding a housing made of resin by using, as a core, the ball section partially covered by the ball seat of the ball seat assembly.

12 Claims, 14 Drawing Sheets

(51) Int. Cl.
*F16C 11/06* (2006.01)
*B60G 7/00* (2006.01)
*B29C 45/16* (2006.01)
*B29K 59/00* (2006.01)
*B29K 101/12* (2006.01)

(52) U.S. Cl.
CPC ........... *B60G 7/005* (2013.01); *B60G 21/055* (2013.01); *B60G 21/0551* (2013.01); *F16C 11/06* (2013.01); *F16C 11/0638* (2013.01); *F16C 11/0657* (2013.01); *F16C 11/0685* (2013.01); *B29C 2045/1673* (2013.01); *B29K 2059/00* (2013.01); *B29K 2101/12* (2013.01); *B60G 2204/1224* (2013.01); *B60G 2204/416* (2013.01); *B60G 2204/422* (2013.01); *B60G 2206/7101* (2013.01); *B60G 2206/7104* (2013.01); *B60G 2206/71043* (2013.01); *B60G 2206/81* (2013.01)

(56) References Cited

U.S. PATENT DOCUMENTS

| | | | | |
|---|---|---|---|---|
| 5,702,660 | A * | 12/1997 | Allott | B29C 45/14754 264/242 |
| 5,947,627 | A | 9/1999 | Uneme et al. | |
| 6,139,788 | A * | 10/2000 | Dorr | B29C 45/14467 264/263 |
| 6,514,443 | B1 * | 2/2003 | Dorr | F16C 11/0657 264/130 |
| 6,875,388 | B2 * | 4/2005 | Trotter | B29C 45/14065 264/234 |
| 9,011,744 | B2 * | 4/2015 | Kim | F16C 11/0657 264/242 |
| 2002/0096799 | A1 * | 7/2002 | Kim | F16C 11/0685 264/242 |
| 2008/0193208 | A1 | 8/2008 | Nordloh et al. | |
| 2012/0025416 | A1 * | 2/2012 | Kim | B29C 45/14754 264/242 |
| 2014/0027995 | A1 | 1/2014 | Kuroda | |
| 2014/0199113 | A1 | 7/2014 | Nordloh et al. | |
| 2016/0097421 | A1 | 4/2016 | Murata et al. | |
| 2019/0003523 | A1 | 1/2019 | Kuroda | |

FOREIGN PATENT DOCUMENTS

| | | |
|---|---|---|
| EP | 3406921 A1 | 11/2018 |
| JP | H03-009113 A | 1/1991 |
| JP | H09-280246 A | 10/1997 |
| JP | 2000-081025 A | 3/2000 |
| JP | 2000-205240 A | 7/2000 |
| JP | 2003-336623 A | 11/2003 |
| JP | 2004-316771 A | 11/2004 |
| JP | 2010-106858 A | 5/2010 |
| JP | 2012-218707 A | 11/2012 |
| JP | 2013-194841 A | 9/2013 |

OTHER PUBLICATIONS

European Search Report for European Application No. 17750294.5, dated Aug. 2, 2019.
Japanese Office Action "Notification of Reasons for Refusal" for Application No. 2016-023994, dated Apr. 5, 2017.
International Search Report for International Application No. PCT/JP2017/004615, dated May 9, 2017.

* cited by examiner

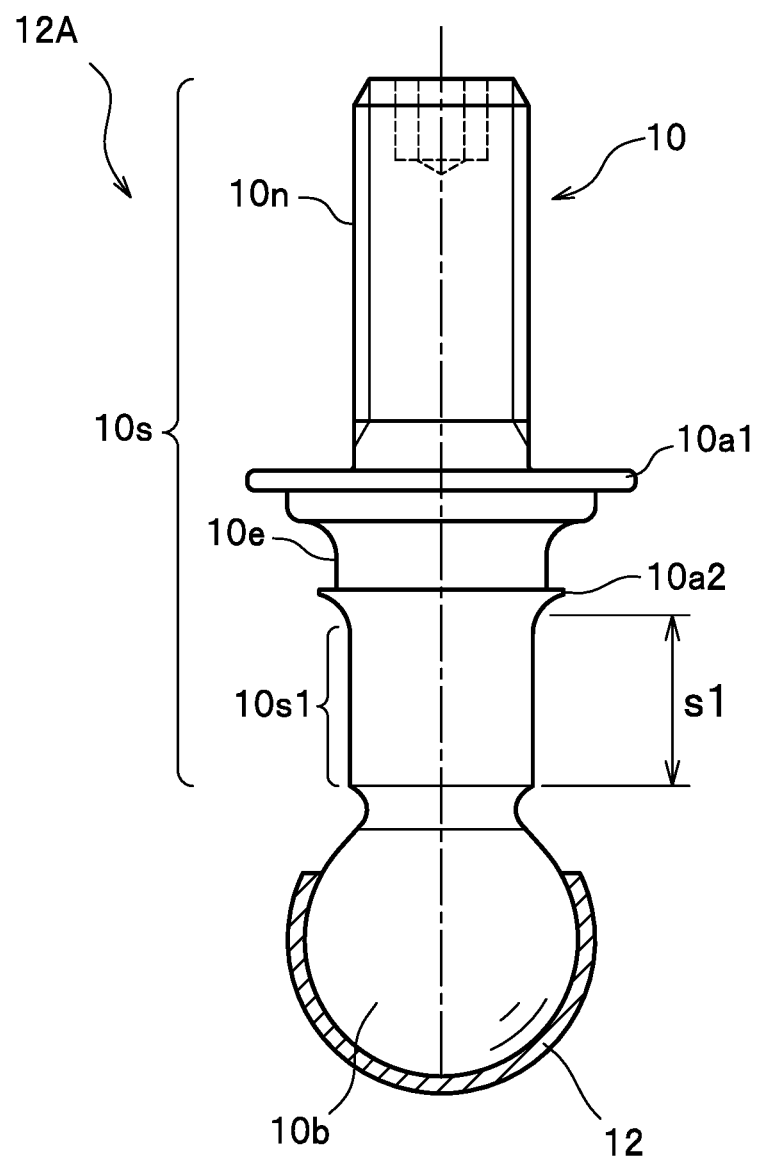

METHOD FOR MANUFACTURING BALL JOINT AND METHOD FOR MANUFACTURING STABILIZER LINK

CROSS-REFERENCE TO RELATED APPLICATION

The present application is the US national phase of International Application No. PCT/JP2017/004615, filed Feb. 8, 2017, which claims priority to Japanese Application No. 2016-023994, filed Feb. 10, 2016. The priority application, JP 2016-023994, is hereby incorporated by reference in its entirety.

TECHNICAL FIELD

The present invention relates to a method for manufacturing a ball joint for constituting a stabilizer link or the like that couples a suspension and a stabilizer of a vehicle and a method for manufacturing a stabilizer link.

BACKGROUND ART

FIG. 16 is a partial sectional view showing a periphery of a conventional ball joint (see Patent Literature 1).

A stabilizer link 101 includes ball joints 100J at both ends of a bar-shaped support bar 101a.

In the ball joint 100J, a ball section 110b at an end portion of a ball stud 110 is swingably and rotatably housed inside a cup-shaped housing 111 via a ball seat 112 made of resin.

In a vehicle, the ball joint 100J at one end portion of the stabilizer link 101 is coupled to a suspension, an arm, and the like (not shown in the figure) via the ball stud 110. The ball stud 110 includes a stud section 110s and the ball section 110b.

The ball joint 100J at the other end portion of the stabilizer link 101 is coupled to a stabilizer (not shown in the figure) via the ball stud 110.

According to traveling of the vehicle, as the suspension strokes, the support bar 101a of the stabilizer link 101 swings and rotates with respect to the ball joint 100J.

In the ball joint 100J, a dust cover 113 made of rubber is provided to prevent intrusion of dust, moisture, and the like into the inside. The dust cover 113 is provided to close a space between the ball stud 110 and the ball seat 112.

A ring-shaped recessed section 112o for fixing a lower end portion 113s of the dust cover 113 is formed in an upper part of the ball seat 112. In the ball stud 110, a brim section 110a1 and a small brim section 110a2 are formed. An upper end portion 113u of the dust cover 113 is fixed between the brim section 110a1 and the small brim section 110a2.

On the other hand, the ball stud 110 swings and rotates according to movements of the stabilizer and the suspension. Therefore, in an upper part of the ball seat 112 that covers the ball section 110b of the ball stud 110, a taper surface 112f1 of a concave conical surface expanded in diameter toward an upper side (a side of the stud section 110s opposite to the ball section 110b) is formed. The taper surface 112f1 is formed as a taper surface corresponding to swing amplitude of the ball stud 110.

Consequently, a flange section 112f including the taper surface 112f1 and the recessed section 112o is formed in the upper part of the ball seat 112.

CITATION LIST(S)

Patent Literature(s)

Patent Literature 1: JP 2003-336623 A
Patent Literature 2: JP 2004-316771 A

SUMMARY OF INVENTION

Technical Problem

Incidentally, when the ball joint 100J is assembled, the ball section 110b of the ball stud 110 is housed in the ball seat 112 formed in advance.

If the diameter of an opening section 112k of the ball seat 112 is too small, it is likely that the opening section 112k is damaged when the ball section 110b is put inside the ball seat 112. In view of this, if the diameter of the opening section 112k is increased to allow the ball section 110b of the ball stud 110 to be easily pushed into the ball seat 112, a fall-off load at the time when the ball section 110b falls off from the inside of the ball seat 112 decreases.

When the fall-off load decreases, the ball section 110b easily falls off from the inside of the ball seat 112.

On the other hand, Patent Literature 2 describes the configuration for insert-injecting an outer housing using, as a core, only a ball section attached with a ball seat.

The configuration of Patent Literature 2 does not have the problem of the opening section and the problem of the fall-off load decrease of Patent Literature 1. However, the stud section is joined to the ball section by resistance welding after the outer housing is molded by the insert injection. Therefore, a hole for disposing an electrode in the ball section is necessary in the outer housing. After the resistance welding, the hole needs to be closed by a lid member.

Thus, in the configuration of Patent Literature 2, there is a problem in that an unnecessary hole is necessary in the outer housing.

There is a demand for solving the problems of Patent Literatures 1 and 2 described above and manufacturing the ball joint 100J with insert injection using, as a core, the ball stud 110 in which the stud section 110s and the ball section 110b are integrated in advance shown in FIG. 16.

However, there is a limitation that length s101 (see FIG. 16) of a straight section 110s1 of the ball stud 110 is small. A reason for this is as explained below.

For example, when an external force of an arrow α10 is applied to the ball section 110b of the ball stud 110 shown in FIG. 16, a bending moment is applied to the stud section 110s. The straight section 110s1 of the ball stud 110 forms a part of an arm of the bending moment. Therefore, the straight section 110s1 is desirably short to reduce the bending moment.

When the straight section 110s1 of the ball stud 110 is long, the dust cover 113 covering the straight section 110s1 inevitably becomes long to have a large movable range. Durability of the dust cover 113 thus deteriorates.

When the straight section 110s1 of the ball stud 110 is long, an occupied space where the ball stud 110 does not come into contact with other components when the ball joint 100J moves is large.

For these reasons, the straight section 110s1 of the ball stud 110 is desirably as short as possible.

Consequently, because the straight section 110s1 of the ball stud 110 is formed short, the small brim section 110a2 (see FIG. 16) is formed near the ball section 110b.

For this reason, the insert molding performed using, as a core, the ball stud 110, in which the ball section 110b and the stud section 110s are integrated in advance, has a problem in that a mold for forming the flange section 112f interferes with the small brim section 110a2 and less easily comes off.

The present invention has been devised in view of the above circumstances and relates to a method for manufacturing a ball joint easy to manufacture and having satisfactory operation performance and a method for manufacturing a stabilizer link.

Solution to Problem

To solve the above problems, a method for manufacturing a ball joint of a first invention includes: a ball-seat molding step for forming a ball seat assembly by using, as a core, a ball section of a ball stud, the ball section of which is integrally provided in advance at one end portion of a stud section, and insert-molding a ball seat made of resin to cover at least a portion of the ball section present on an opposite side to the stud section; and a housing molding step for insert-molding a housing made of resin by using, as a core, the ball section partially covered by the ball seat of the ball seat assembly.

A method for manufacturing a ball joint of a second invention includes a housing molding step for insert-molding a housing made of resin, by using, as a core, a ball section of a ball stud, the ball section of which is integrally provided in advance at one end portion of a stud section, to cover at least a portion of the ball section present on an opposite side to the stud section.

A method for manufacturing a stabilizer link of a third invention is a method for manufacturing a stabilizer link including a bar-shaped support bar and the ball joint of the first or second invention provided at an end portion of the support bar, for coupling a suspension and a stabilizer of a vehicle. In the housing molding step in the method for manufacturing a ball joint of the first or second invention, the housing is insert-molded using, as a core, at least any end portion in a longitudinal direction of the support bar.

Advantageous Effects of Invention

According to the present invention, it is possible to provide a method for manufacturing a ball joint easy to manufacture and having satisfactory operation performance and a method for manufacturing a stabilizer link.

BRIEF DESCRIPTION OF DRAWINGS

FIG. 10 is an exterior view showing a ball stud, a straight section of which is relatively long;

DESCRIPTION OF EMBODIMENTS

Hereinafter, embodiments of the present invention will be described with reference to the drawings as appropriate.

First Embodiment

Figure 1:
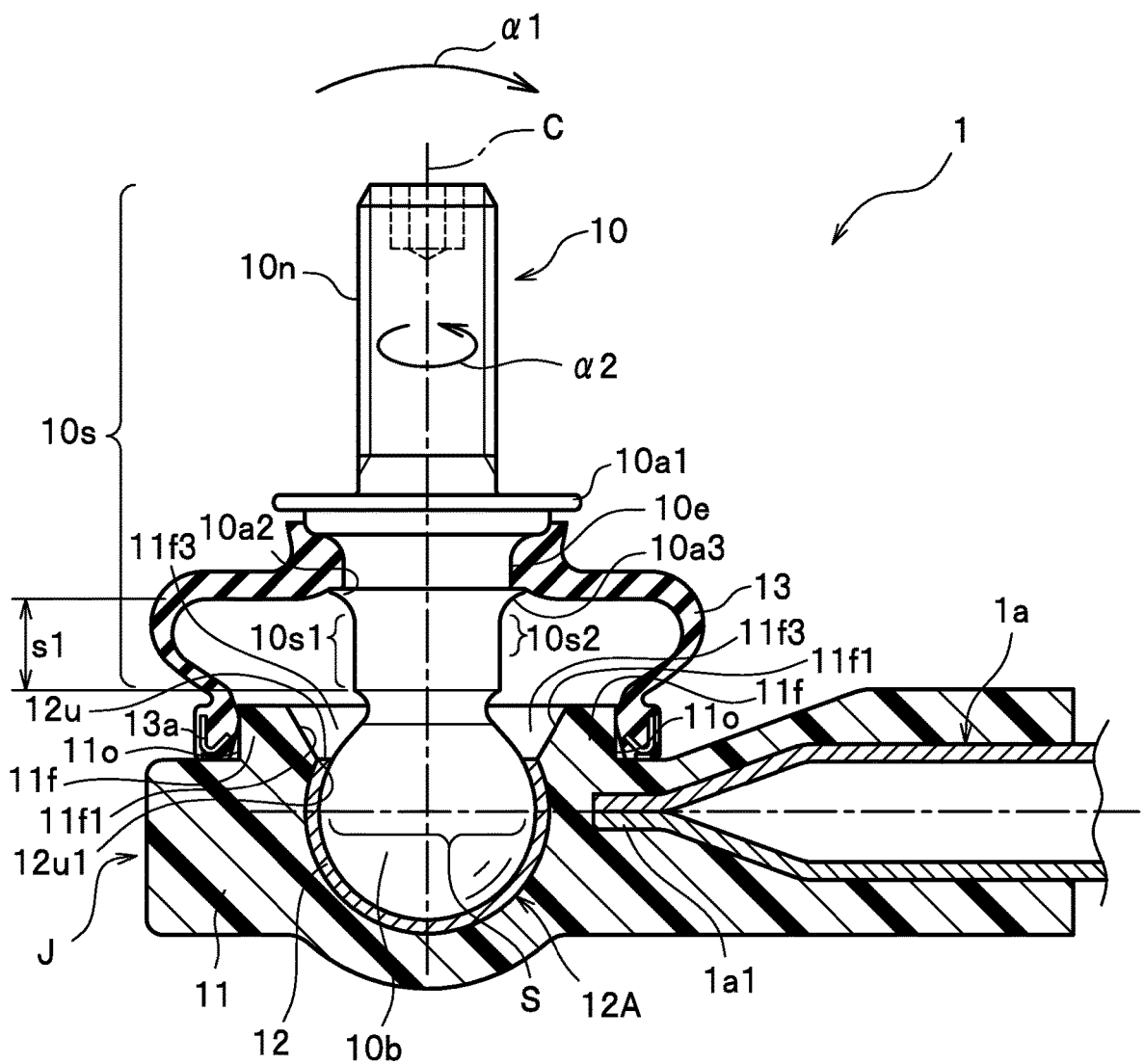
FIG. 1 is a longitudinal sectional view of a ball joint of a stabilizer link of a first embodiment according to the present invention.

FIG. 1 is a longitudinal sectional view of a ball joint of a stabilizer link of a first embodiment according to the present invention.

In a ball joint J of the first embodiment, a ball seat 12 made of resin is inserted-molded in a ball section 10b at an end portion of a ball stud 10. The ball joint J has a characteristic in that an outer housing 11 made of resin is insert-molded in the ball section 10b covered with the ball seat 12 and a distal end portion 1a1 of a support bar 1a.

Figure 4:
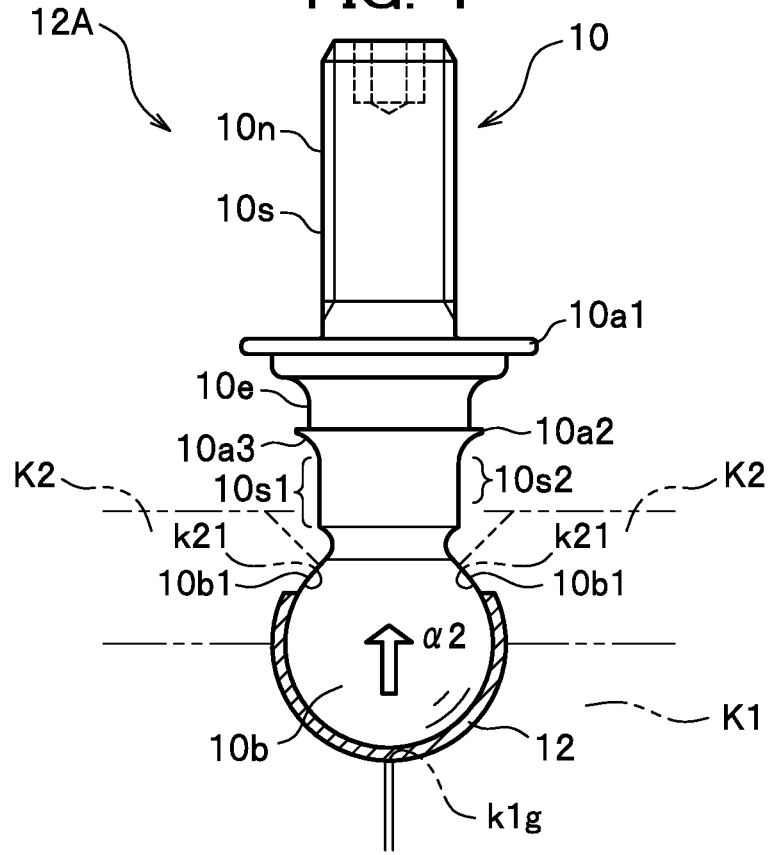
FIG. 4 is an exterior view showing a state in which a ball seat is attached to the ball stud.

Specifically, the ball seat 12 made of resin is formed by insert injection molding using, as a core, the ball section 10b of the ball stud 10 to manufacture a ball seat assembly 12A (see FIG. 4). Thereafter, the outer housing 11 (see FIG. 1) is formed by the insert injection molding using, as a core, the ball section 10b, on which the ball seat 12 of the ball seat assembly 12A is formed, and the distal end portion 1a1 of the support bar 1a.

As explained above, it is possible to realize a combined structure without gaps between the ball section 10b of the ball stud 10 and the ball seat 12 and between the ball seat 12 and the outer housing 11. Consequently, the ball section 10b of the ball stud 10 can smoothly swing and rotate with respect to the ball seat 12.

Application of the ball joint J of the first embodiment to a stabilizer link 1 used in a vehicle is explained.

Figure 2:
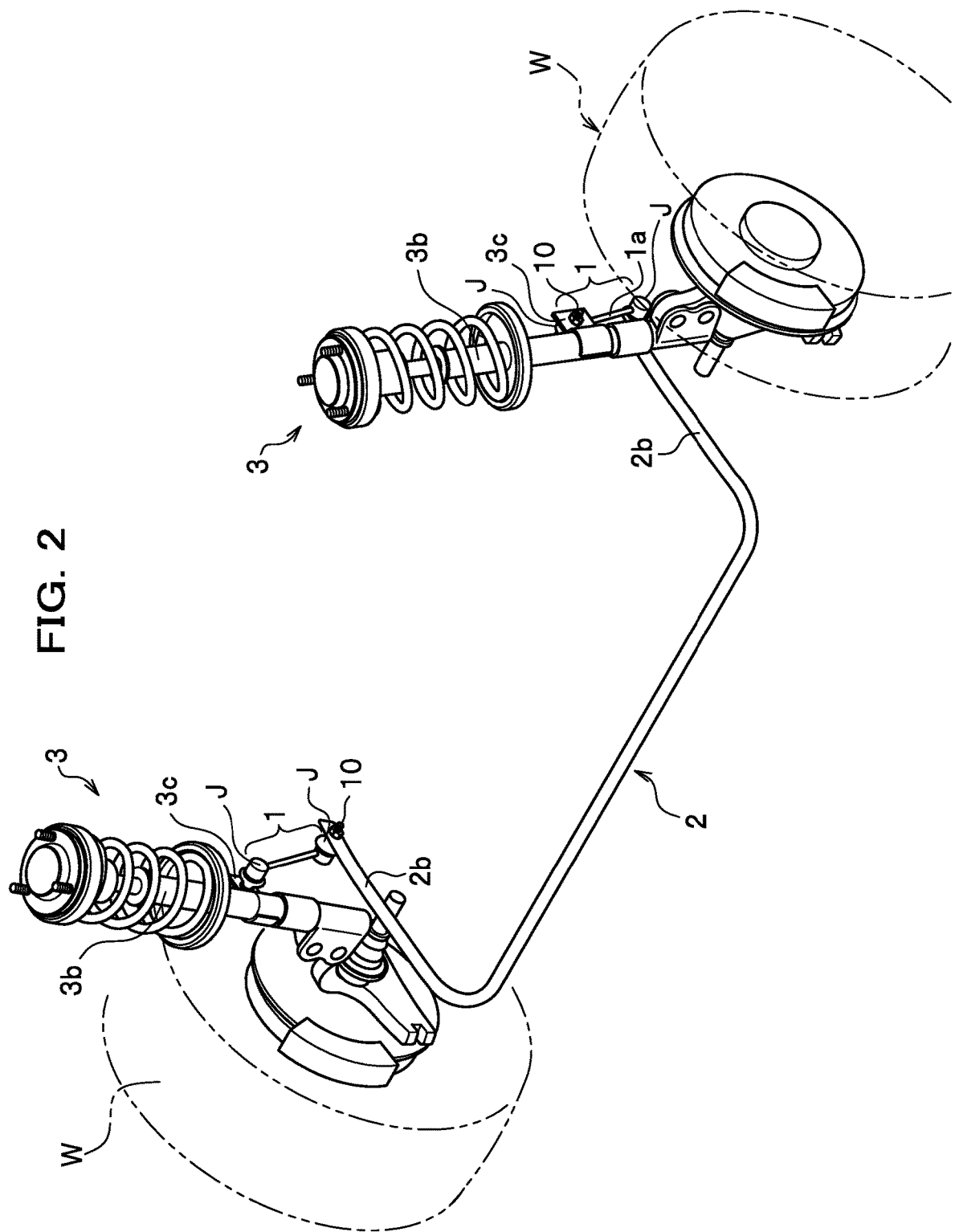
FIG. 2 is a perspective view showing a state in which a suspension and a stabilizer are coupled to the stabilizer link including the ball joint of the first embodiment.

FIG. 2 is a perspective view showing a state in which a suspension and a stabilizer are coupled to the stabilizer link including the ball joint of the first embodiment.

A wheel W responsible for traveling of a vehicle (not shown in the figure) is attached to a vehicle body (not shown in the figure) via a suspension 3. The suspension 3 and a stabilizer 2 are coupled via the ball joint J at an end portion of the stabilizer link 1.

<Ball Stud 10>

The ball stud 10 shown in FIG. 1 includes a bar-shaped stud section 10s and a spherical ball section 10b.

The spherical ball section 10b is formed at one end portion of the ball stud 10. The stud section 10s is formed at the other end portion of the ball stud 10.

In the stud section 10s of the ball stud 10, a brim section 10a1 and a small brim section 10a2 spreading in a circumferential shape are formed separate from each other. A male screw 10n is threaded further on the stud section 10s side than the brim section 10a1.

A dust cover 13 is disposed between a convex flange section 11f in an upper part of the outer housing 11 and the brim section 10a1. The dust cover 13 is a member that blocks intrusion of rain water, dust, and the like into the ball joint J.

An upper end circumferential portion of the dust cover 13 is fit in a circumferential recessed section 10e between the brim section 10a1 and the small brim section 10a2. On the other hand, a part near an iron link 13a embedded in a lower end circumferential portion of the dust cover 13 is fit and fixed in a recessed section 11o around the convex flange section 11f of the outer housing 11.

As shown in FIG. 2, the ball stud 10 projecting from one ball joint J of the support bar 1a is fastened and fixed to a bracket 3c of a dumper 3b. The ball stud 10 projecting from the other ball joint J is fastened and fixed to an arm section 2b of the stabilizer 2.

The stabilizer link 1 is swingably (an arrow α1 in FIG. 1) and rotatably (an arrow a2 in FIG. 1) supported by the ball joints J at both ends portions. The stabilizer link 1 is configured to be movable with respect to the dumper 3b and the arm section 2b (see FIG. 2). In other words, the stabilizer link 1 can move according to movements of the suspension 3 and the stabilizer 2.

<Ball Joint J>

The configuration of the ball joint J is explained in detail.

In the ball joint J shown in FIG. 1, as explained above, the ball seat 12 made of resin is formed by insert molding around the ball section 10b of the ball stud 10. The outer housing 11 made of resin is insert-molded using, as a core, the ball section 10b, around which the ball seat 12 is formed, and the distal end portion 1a1 of the support bar 1a.

Because the ball section 10b at one end portion of the ball stud 10 is made of metal such as steel, an external force is applied to the ball section 10b to peel the ball section 10b from the ball seat 12 made of resin integrally molded in the outer housing 11 made of resin. Consequently, the ball section 10b of the ball stud 10 is swingably (the arrow α1 in FIG. 1) and rotatably (the arrow α2 in FIG. 1) supported by the ball seat 12.

In this way, the ball joint J is configured with the ball section 10b at one end portion of the ball stud 10 covered with the ball seat 12 and further covered with the outer housing 11 made of resin together with the distal end portion 1a1 of the support bar 1a.

A straight section 10s1 having a columnar shape is formed on the ball section 10b side of the small brim section 10a2 formed in a circumferential shape in the stud section 10s of the ball stud 10.

Alternatively, a lower part of an R section 10a3 under the small brim section 10a2 may be formed as a straight section 10s2 having a columnar shape extending straight at length of 1 mm or more. A section from under the straight section 10s2 to the vicinity of the ball section 10b may be formed in a taper shape of a conical surface thinned toward the ball section 10b.

As the outer housing 11, PA66-GF30 (PA66 added with a glass fiber having a weight ratio of 30%) is used. Note that the material of the outer housing 11 only has to satisfy a strength requirement. For example, engineering plastic such as PEEK (polyetheretherketone), PA66 (Polyamide 66), PPS (Ply Phenylene Sulfide Resin), or POM (polyoxymethylene), super engineering plastic, FRP (Fiber Reinforced Plastics), GRP (glass reinforced plastic), CFRP (Carbon Fiber Reinforced Plastics), or the like is used.

The convex flange 11f having a convex shape is annularly formed in an upper part of the outer housing 11. An opening section 11β, through which a near part of the stud section 10s of the ball section 10b is inserted, is formed in the convex flange 11f.

The convex flange 11f is formed to include, in the opening section 11β, a conical surface-shaped taper section 11f1 spreading outward from an upper end 12u of the ball seat 12.

In other words, in an upper part of the outer housing 11, in the opening section 11β of the convex flange 11f, the conical surface-shaped taper section 11f1 having a recessed shape widening toward the opposite side of the stud section 10s to the ball section 10b is formed.

A start point of the taper section 11f1 is an outer side corner 12u1 of the upper end 12u of the ball seat 12.

A maximum swing angle in swinging (the arrow α1 in FIG. 1) of the ball stud 10 is set by an inclination angle of the ball stud 10 of the taper section 11f1, which is the inner circumferential surface of the convex flange 11f, with respect to an axis C and an inclination angle of the outer circumferential surface of the straight section 10s1 of the ball stud 10 with respect to the axis C.

The ball seat 12 is formed to include a spherical inner surface that covers the spherical ball section 10b of the ball stud 10.

POM is use as the material of the ball seat 12. Besides the POM, the material of the ball seat 12 may be another material if the material is thermoplastic resin like the POM and satisfies a friction requirement and the like. As explained above, because the ball section 10b of the ball stud 10 swings and rotates, the inner surface of the ball seat 12 is requested to have predetermined friction durability.

As the ball seat 12, engineering plastic such as PEEK (polyetheretherketone), PA66 (Polyamide 66), PA6 (Polyamide 6), or PPS (Ply Phenylene Sulfide Resin) or super engineering plastic is used. Because the ball seat 12 is formed by the insert molding, the ball seat 12 is desirably thermoplastic resin.

The thickness of the ball seat 12 is set to 0.4 mm or more and 2.0 mm or less. When the thickness of the ball seat 12 is less than 0.4 mm, fluidity of resin during molding is deteriorated. On the other hand, when the thickness of the ball seat 12 is more than 2.0 mm, because the ball seat 12 is an elastic material, an elastic deformation amount increases and an elastic lift amount increases.

Therefore, the thickness of the ball seat 12 is suitably 0.4 mm or more and 2.0 mm or less.

Because the outer housing 11 is thick, contraction after molding is large. Therefore, after the molding of the outer housing 11, the ball section 10b is tightened inward by the outer housing 11 and the ball seat 12. Therefore, torque tuning is performed depending on a target torque range of swinging and sliding torque of the ball stud 10. Note that the swinging and sliding torque is a general term of swinging torque (the arrow α1 in FIG. 1) at the time when the ball stud 10 swings and rotation torque (the arrow α2 in FIG. 1) at the time when the ball stud 10 rotates.

For example, a steel pipe is used as the support bar 1a. The distal end portion 1a1 is pressed in an extending direction of the ball stud 10 and is plastically deformed in a flat shape.

<Method for Manufacturing the Ball Joint J>

A method for manufacturing the ball joint J is explained.

Figure 3:
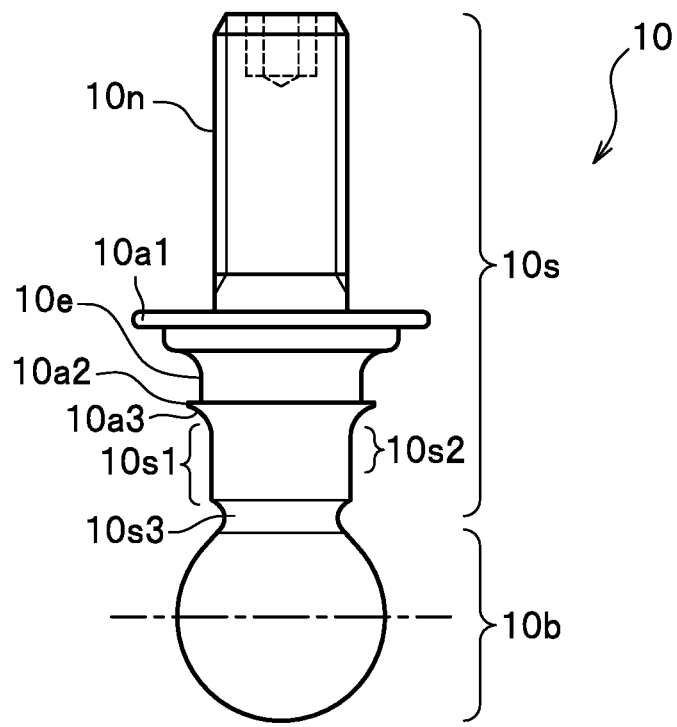
FIG. 3 is an exterior view showing an integrally manufactured ball stud.

FIG. 3 is an exterior view showing an integrally manufactured ball stud.

In the ball stud 10, the stud section 10s and the ball section 10b may be integrally molded. Before the insert molding, the ball section 10b may be joined to and integrated with the stud section 10s by welding.

In the first embodiment, an example is explained in which the stud section 10s and the ball section 10b are integrally manufactured in the ball stud 10.

FIG. 4 is an exterior view showing a state in which the ball seat is attached to the ball stud.

After manufacturing of the ball stud 10, the ball seat 12 is insert-molded using, as a core, the ball section 10b of the ball stud 10 and, for example, using a first molding die K1 and a second molding die K2 to manufacture a ball seat assembly 12A.

In this case, resin for molding the ball seat 12 is discharged from a gate k1g of the first molding die K1 provided on the opposite side of the ball section 10b to the stud 10s.

An upper spherical surface section 10b1 of the ball section 10b is pressed against (a white arrow α2 in FIG. 4) and closely attached to a spherical surface k21 of the second molding die K2 disposed on the side of the stud section 10s by a discharge pressure of the resin. Consequently, the ball seat 12 can be molded without the resin for molding the ball seat 12 leaking to the upper spherical surface section 10b1 of the ball section 10b.

Subsequently, the outer housing 11 (see FIG. 1) is insert-molded as explained below using, as a core, the ball section 10b, around which the ball seat 12 of the ball seat assembly 12A is formed, and the distal end portion 1a1 of the support bar 1a.

Figure 5A:
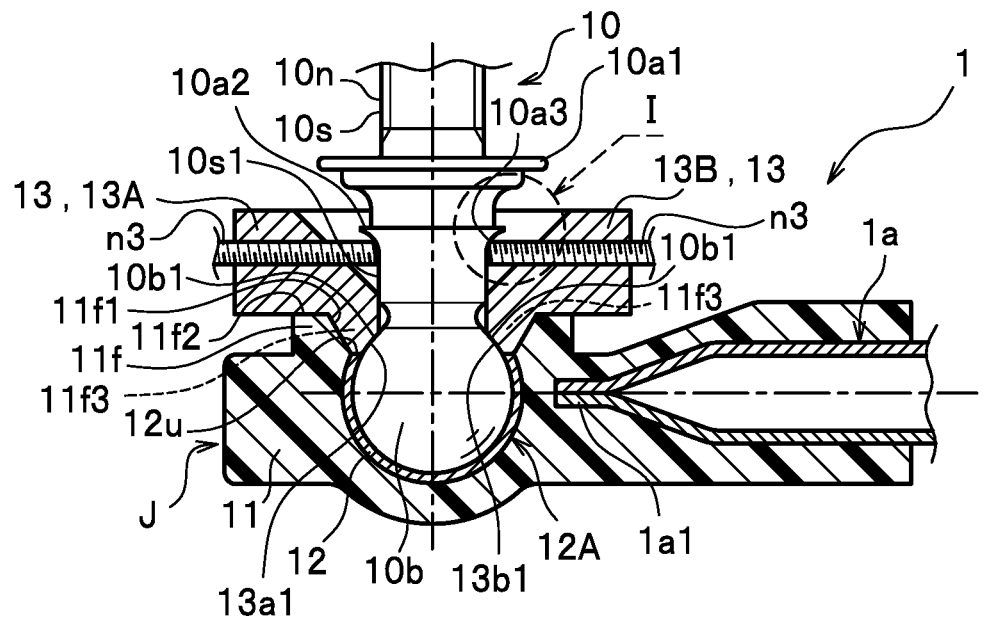
FIG. 5A is a partial sectional view showing a state immediately after an outer housing is insert-molded using, as a core, a ball seat assembly and a distal end portion of a support bar.
Figure 5B:
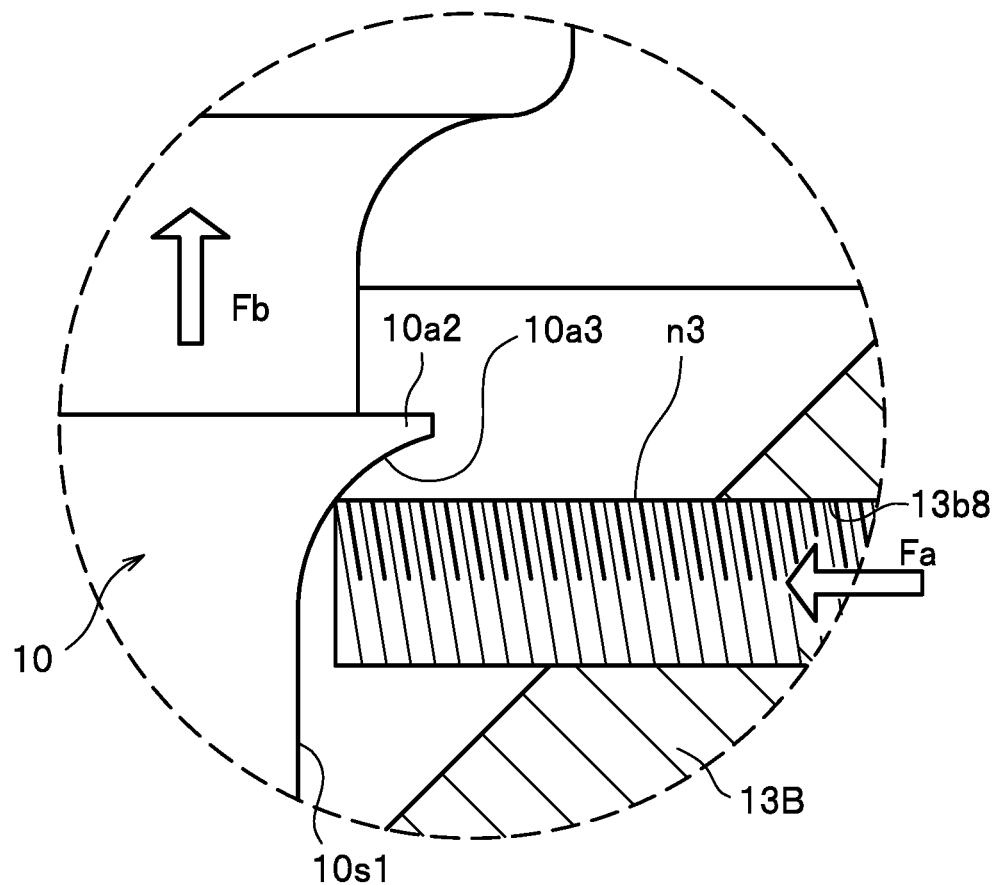
FIG. 5B is an enlarged view of a I part in FIG. 5A.

FIG. 5A is a partial sectional view showing a state immediately after the outer housing is insert-molded using, as a core, the ball seat assembly and the distal end portion of the support bar. FIG. 5B is an enlarged view of an I part in FIG. 5A.

When the outer housing 11 is insert-molded using, as a core, the ball section 10b, on which the ball seat 12 of the ball seat assembly 12A is formed, and the distal end portion 1a1 of the support bar 1a, resin for molding the outer housing 11 needs to be prevented from leaking to the ball section 10b on the stud section 10s side and the straight section 10s1.

Therefore, a force Fb in the upward direction (see FIG. 5B) is generated by pushing (a force Fa in FIG. 5B) the R section 10a3 of the ball stud 10 with the distal end of a locking screw n3 for close attachment. Consequently, the ball stud 10 is moved in the upward direction and the upper spherical surface section 10b1 of the ball section 10b on the stud section 10s side is brought into close contact with a divided inner piece 13 (13A and 13B) of a mold.

To set a swing angle of the ball stud 10 and form a recessed section 110 for fixing the part near the iron link 13a (see FIG. 1) at the lower end circumferential portion of the dust cover 13, the convex flange section 11f needs to be formed in the upper part of the outer housing 11.

Therefore, to form the taper section 11f1 on the inner circumferential surface of the convex flange section 11f, an inner piece is necessary in insert-molding the outer housing 11 using, as a core, the ball section 10b, on which the ball seat 12 is formed around the ball seat assembly 12A (see FIG. 4), and the distal end portion 1a1 of the support bar 1a.

However, as explained above, length s1 (see FIG. 1) of the straight section 10s1 of the ball stud 10 is desirably small in terms of, for example, suppressing a bending moment applied to the outer housing 11 and the like, maintenance of durability of the dust cover 13, and a reduction of an occupied space of the stabilizer link 1.

After the molding of the convex flange section 11f, an inner piece in which the taper section 11f1 is formed needs to be cut out. However, because the brim section 10a1 and the small brim section 10a2 spreading in the circumferential shape are formed in the stud section 10s of the ball stud 10, when the length s1 of the straight section 10s1 is small, the inner piece needs to be cut out not to interfere with the small brim section 10a2 and the brim section 10a1. That is, when the straight section 10s1 of the ball stud 10 is short, an event occurs in which, when the inner piece is cut out after the molding, the inner piece comes into contact with the small brim section 10a2 and cannot be cut out.

Therefore, a method for cutting out the inner piece of the mold in which the taper section 11f1 is formed is a problem.

Figure 6:
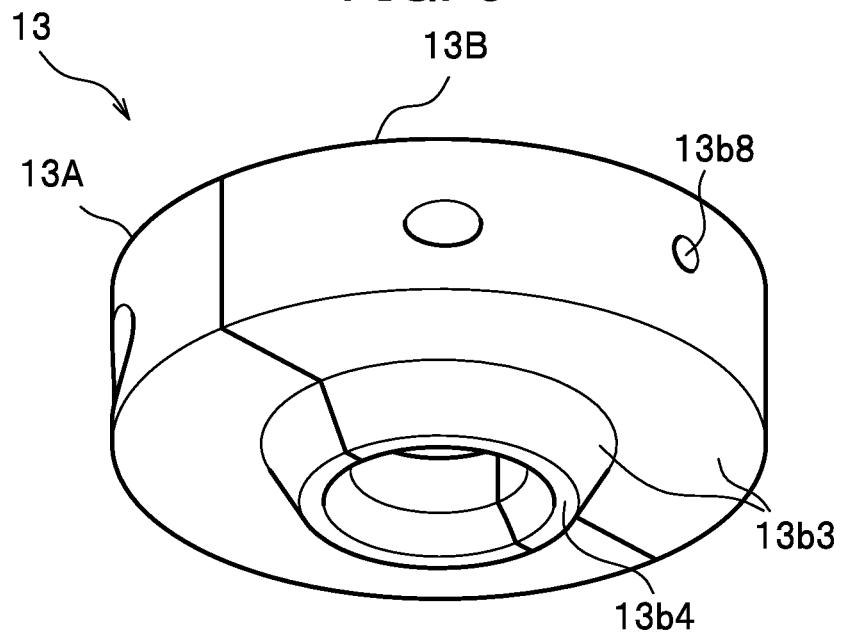
FIG. 6 is a perspective view showing a divided inner piece.

To solve the problem, in the insert molding of the outer housing 11, the divided inner piece 13 (13A and 13B), which is a divided mold shown in FIG. 6 explained below, is used. FIG. 6 is a perspective view showing the divided inner piece.

In the insert molding of the outer housing 11, the insert molding is carried out in a state in which the divided inner piece 13 adheres to the upper spherical surface section 10b1 of the ball stud 10 above the ball seat 12 (see FIG. 5A). The other kinds of molding of the outer housing 11 is performed with other main molds (not shown in the figure) surrounding the ball section 10b on which the ball seat 12 is formed and the distal end portion 1a1 of the support bar 1a. Note that, in FIG. 5A, the divided inner piece 13 is shown and the other main molds are omitted. Note that the support bar 1*a* shown in FIG. 5A and FIG. 9A to FIG. 9D, FIG. 11A, FIG. 11B, and the like referred to below is disposed in a position where the support bar 1*a* does not hinder a molding process in which the divided inner piece 13 is used.

The divided inner piece 13 is detached after the outer housing 11 is molded with respect to the ball section 10*b*, on which the ball seat 12 is formed, of the ball stud 10 and the distal end portion 1*a*1 of the support bar 1*a*, that is, after the convex flange 11*f* of the outer housing 11 is molded.

<Divided Inner Piece 13>

Figure 7A:
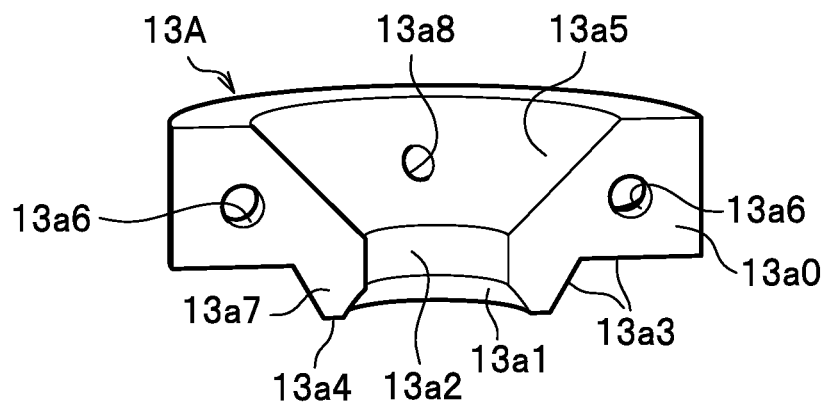
FIG. 7A is a view of a first divided inner piece constituting the divided inner piece viewed from an inner upward direction.
Figure 7B:
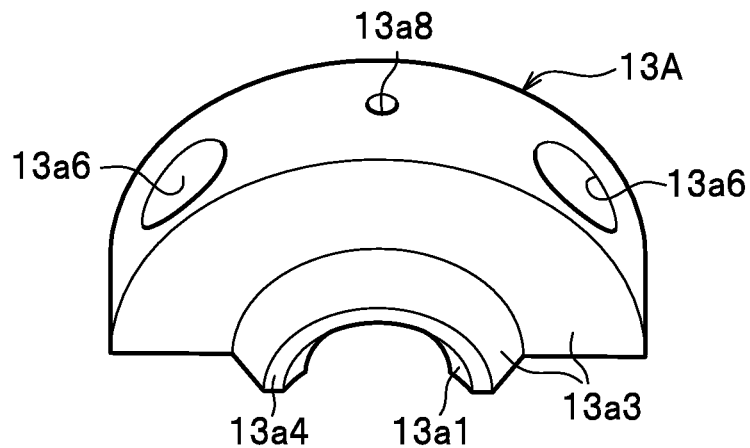
FIG. 7B is a view of the first divided inner piece constituting the divided inner piece viewed from an outer downward direction.
Figure 8A:
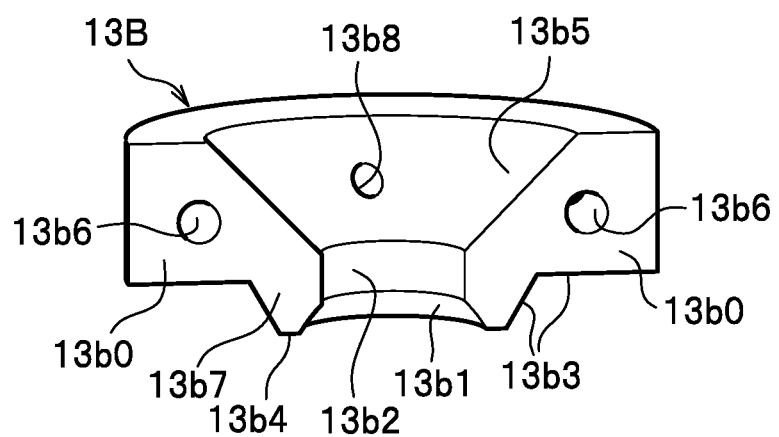
FIG. 8A is a view of a second divided inner piece constituting the divided inner piece viewed from the inner upward direction.
Figure 8B:
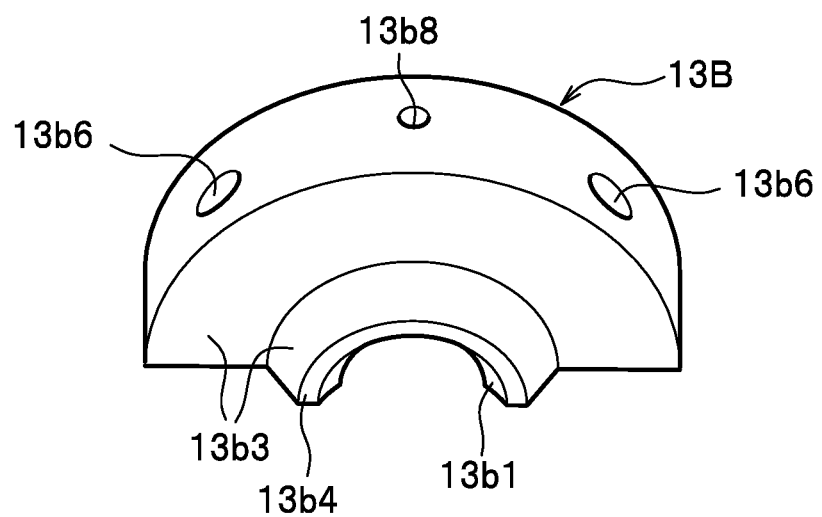
FIG. 8B is a view of the second divided inner piece constituting the divided inner piece viewed from the outer downward direction.

The divided inner piece 13 (see FIG. 6) has a half-divided configuration and is configured by a first divided inner piece 13A (see FIG. 7A and FIG. 7B) and a second divided inner piece 13B (see FIG. 8A and FIG. 8B).

FIG. 7A is a view of the first divided inner piece constituting the divided inner piece viewed from an inner upward direction. FIG. 7B is a view of the first divided inner piece constituting the divided inner piece viewed from an outer downward direction. FIG. 8A is a view of the second divided inner piece constituting the divided inner piece viewed from the inner upward direction. FIG. 8B is a view of the second divided inner piece constituting the divided inner piece viewed from the outer downward direction.

The first divided inner piece 13A shown in FIG. 7A and FIG. 7B assumes a shape of one of half-divided shapes of the divided inner piece 13. The first divided inner piece 13A has a semi-annular shape including a plane section 13*a*0 of a contact surface with the second divided inner piece 13B and a convex flange insertion section 13*a*7.

In the first divided inner piece 13A, a first inner spherical surface 13*a*1, a first columnar surface 13*a*2, a first flange contact surface 13*a*3, a first ball seat contact surface 13*a*4, and a first escaping section 13*a*5 are respectively formed in half-divided shapes. Screw insert-through holes 13*a*6 for fixing and a female screw section 13*a*8 for close contact are formed in the first divided inner piece 13A.

The first inner spherical surface 13*a*1 is closely attached to the ball section 10*b* of the ball stud 10. Therefore, the first inner spherical surface 13*a*1 has a spherical shape conforming to the ball section 10*b*. The first columnar surface 13*a*2 is slid along the straight section 10*s*1 (see FIG. 5A) of the ball stud 10. Therefore, the first columnar surface 13*a*2 has a semi-columnar shape conforming to the straight section 10*s*1. The first flange contact surface 13*a*3 forms an upper surface 11*f*2 and the taper section 11*f*1 of the convex flange 11*f* (see FIG. 5A). Therefore, the first flange contact surface 13*a*3 includes a plane forming the upper surface of the convex flange 11*f* and a semi-conical surface forming the taper section 11*f*1.

The first ball seat contact surface 13*a*4 includes a semi-annular plane forming the upper end 12*u* (see FIG. 5A) of the ball seat 12.

Figure 9A:
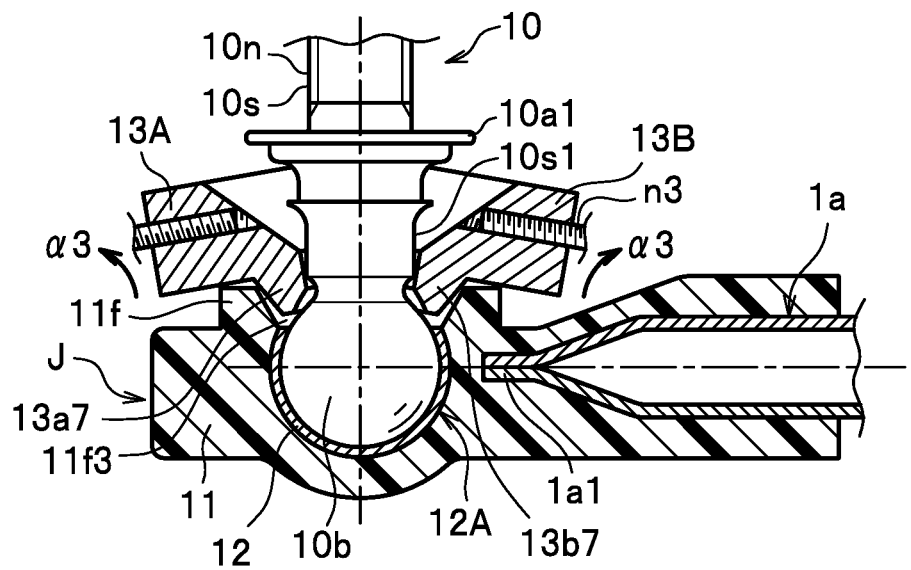
FIG. 9A is a partial sectional side view showing an example of a process for detaching the first divided inner piece and the second divided inner piece after insert molding of the outer housing.
Figure 9B:
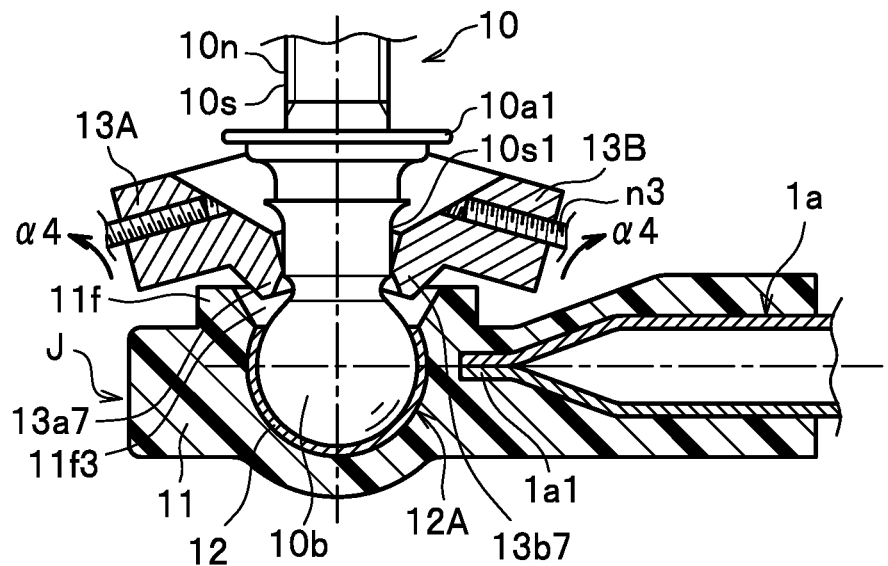
FIG. 9B is a partial sectional side view showing the example of the process for detaching the first divided inner piece and the second divided inner piece after the insert molding of the outer housing.
Figure 9C:
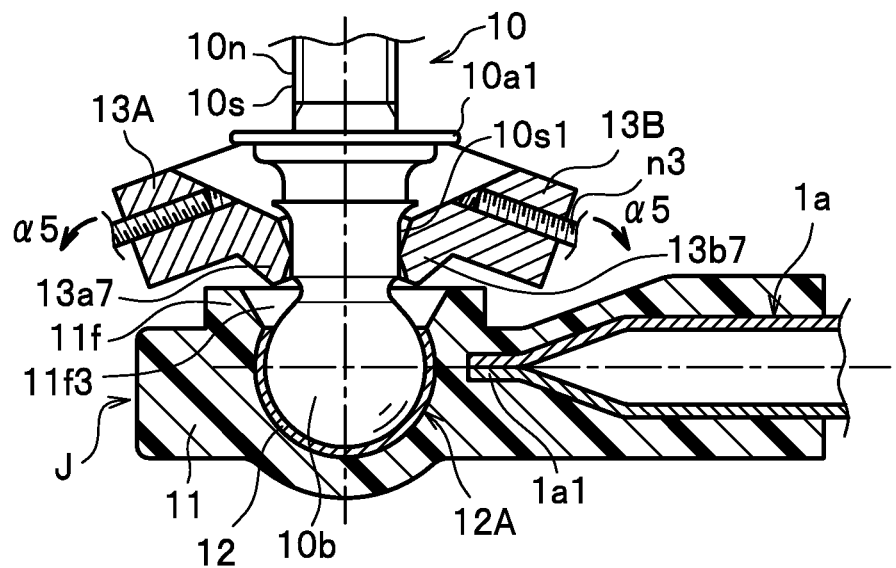
FIG. 9C is a partial sectional side view showing the example of the process for detaching the first divided inner piece and the second divided inner piece after the insert molding of the outer housing.

The first escaping section 13*a*5 is an escaping section in detaching the first divided inner piece 13A from between the ball section 10*b* and the small brim section 10*a*2 of the ball stud 10 (see FIG. 9A to FIG. 9C). The first escaping section 13*a*5 has a semi-conical surface shape. The screw insert-through holes 13*a*6 are holes in which screws for fixing the first divided inner piece 13A and the second divided inner piece 13B are housed. Therefore, the screw insert-through holes 13*a*6 are stepped holes and are formed by small-diameter holes through which male screws are inserted and large-diameter holes in which screw heads are housed.

The female screw section 13*a*8 for close attachment is a female screw in which the locking screw n3 for close attachment acting such that the first inner spherical surface 13*a*1 adheres to the upper spherical surface section 10*b*1 (see FIG. 5A) of the ball stud 10 is screwed.

The second divided inner piece 13B shown in FIG. 8A and FIG. 8B assumes the other shape of the half-divided shape of the divided inner piece 13. The second divided inner piece 13B has a semi-annular shape including a flat section 13*b*0 of a contact surface with the first divided inner piece 13A and a convex flange insertion section 13*b*7.

In the second divided inner piece 13B, a second inner spherical surface 13*b*1, a second columnar surface 13*b*2, a second flange contact surface 13*b*3, a second ball seat contact surface 13*b*4, and a second escaping section 13*b*5 are respectively formed in half-divided shapes. A female screw section 13*b*6 for fixing and a female screw section 13*b*8 for close contact are formed.

The second divided inner piece 13B has a shape symmetrical with the first divided inner piece 13A. Therefore, the second divided inner piece 13B is shown with a sign "a" of the components of the first divided inner piece 13A changed to a sign "b". Detailed explanation of the components is omitted.

<Insert Molding of the Outer Housing 11>

The insert molding of the outer housing 11 performed using, as a core, the ball section 10*b*, on which the ball seat 12 of the ball seat assembly 12A is formed, and the distal end portion 1*a*1 of the support bar 1*a* is carried out as explained below.

As shown in FIG. 5A, the periphery of the ball seat 12 around the ball section 10*b* of the ball stud 10 and the distal end portion 1*a*1 of the support bar 1*a* is covered a not-shown main mold and the divided inner piece 13 leaving a space in which the outer housing 11 is formed.

In this case, as shown in FIG. 5A, the distal end portions of the locking screws 3 for close attachment respectively screwed in the female screw sections 13*a*8 and 13*b*8 of the divided inner piece 13 push the R section 10*a*3 of the ball stud 10 in the horizontal direction (a force Fa in FIG. 5B). Consequently, the R section 10*a*3 of the ball stud 10 receives an upward force (a force Fb in FIG. 5B) as a triangular component force by an inclined surface. The ball stud 10 moves upward. With the force Fb, the upper spherical surface section 10*b*1 of the ball section 10*b* of the ball stud 10 surely adheres respectively to the first and second inner spherical surfaces 13*a*1 and 13*b*1 of the first and second divided inner pieces 13A and 13B.

In this state, resin for forming the outer housing 11 is filled in a space covered with the not-shown main mold and the first divided inner piece 13A and the second divided inner piece 13B. The outer housing 11 that covers the ball seat 12 around the ball section 10*b* of the ball stud 10 and the distal end portion 1*a*1 of the support bar 1*a* is formed.

In this way, when the outer housing 11 is insert-molded using, as a core, the ball section 10*b* of the ball seat assembly 12A and the distal end portion 1*a*1 of the support bar 1*a*, the first inner spherical surface 13*a*1 of the first divided inner piece 13A and the second inner spherical surface 13*b*1 of the second divided inner piece 13B adhere to the upper spherical surface section 10*b*1 of the ball section 10*b* above the ball seat 12. Therefore, the resin of the outer housing 11 does not leak to the ball section 10*b* above the ball seat 12 (see FIG. 5A). The ball section 10*b* can be positioned in a predetermined position without using a special jig.

Note that the locking screws n3 of closely attaching means for respectively closely attaching the first and second inner spherical surfaces 13*a*1 and 13*b*1 of the first and second divided inner pieces 13A and 13B to the upper spherical surface 10b1 of the ball section 10b may be substituted by other closely attaching means such as cams or air cylinders.

<Detachment of the First Divided Inner Piece 13A and the Second Divided Inner Piece 13B after the Insert Molding>

After the molding, after the resin is cooled and hardened, the first divided inner piece 13A and the second divided inner piece 13B are detached together with the not-shown main mold as explained below.

As explained above, the straight section 10s1 of the ball stud 10 is desirably short. The convex flange 11f is formed to project upward in the upper part of the outer housing 11. In addition, the brim section 10a1 and the small brim section 10a2 are formed in the stud section 10s of the ball stud 10.

The first divided inner piece 13A and the second divided inner piece 13B are formed in a semi-annular shape. Therefore, the first divided inner piece 13A and the second divided inner piece 13B interfere with the small brim section 10a2. The first divided inner piece 13A and the second divided inner piece 13B cannot be detached from a state after the molding of the outer housing 11 shown in FIG. 5A in a horizontal direction movement and a vertical direction movement of a linear movement.

Therefore, after the insert molding of the outer housing 11, the first divided inner piece 13A and the second divided inner piece 13B are detached as explained below.

FIG. 9A to FIG. 9D are partial sectional side views showing an example of a process for detaching the first divided inner piece and the second divided inner piece after the insert molding of the outer housing 11.

First, screws (not shown in the figures) for fixing the first divided inner piece 13A and the second divided inner piece 13B are loosened and removed. The locking screws n3 screwed in the female screw sections 13a8 and 13b8 are loosened to retract into the first and second divided inner pieces 13A and 13B.

Subsequently, as indicated by an arrow α3 in FIG. 9A and an arrow α4 in FIG. 9B, while the first divided inner piece 13A and the second divided inner piece 13B are gradually lifted in the direction on the stud section 10s side, a portion located near the distal end of the stud section 10s in the upper part is rotated outward to pull out the convex flange insertion section 13a7 of the first divided inner piece 13A and the convex flange insertion section 13b7 of the second divided inner piece 13B from the inside of the convex flange 11f of the outer housing 11.

Further, as indicated by an arrow α5 in FIG. 9C, while the first divided inner piece 13A and the second divided inner piece 13B are gradually lifted in the direction on the stud section 10s side, a portion located near the distal end of the stud section 10s in the upper part is rotated to gradually pull out the convex flange insertion section 13a7 of the first divided inner piece 13A and the convex flange insertion section 13b7 of the second divided inner piece 13B from the inside of the convex flange 11f of the outer housing 11.

Figure 9D:
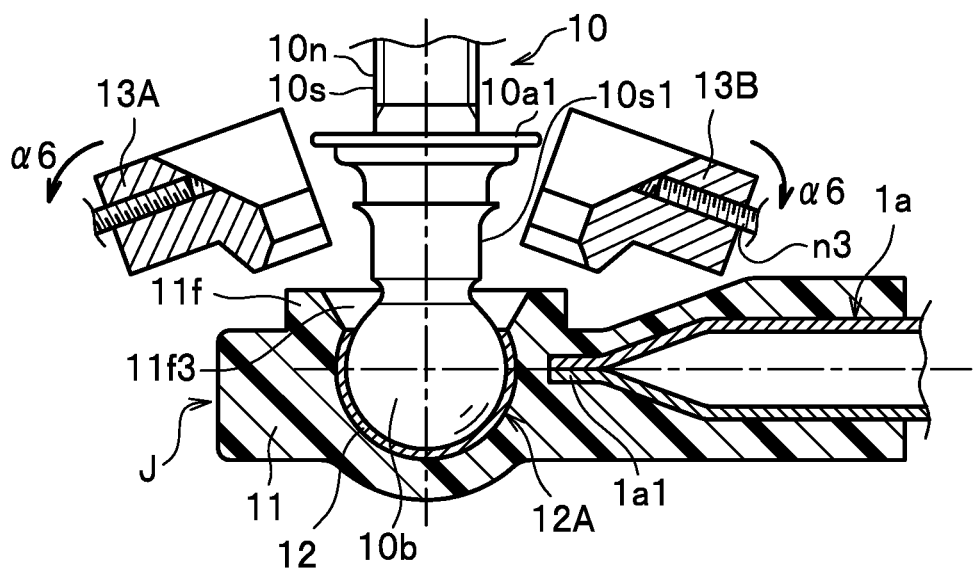
FIG. 9D is a partial sectional side view showing the example of the process for detaching the first divided inner piece and the second divided inner piece after the insert molding of the outer housing.

As indicated by an arrow α6 in FIG. 9D, while the first divided inner piece 13A and the second divided inner piece 13B are lifted upward, the upper part is rotated outward to completely take out and detach the first and second divided inner pieces 13A and 13B from the convex flange section 11f of the outer housing 11.

Consequently, even when the stud section 10s of the ball stud 10 is short, the outer housing 11 including the taper section 11f1 having a recessed shape in the opening section 11f3 can be molded.

Figure 11A:
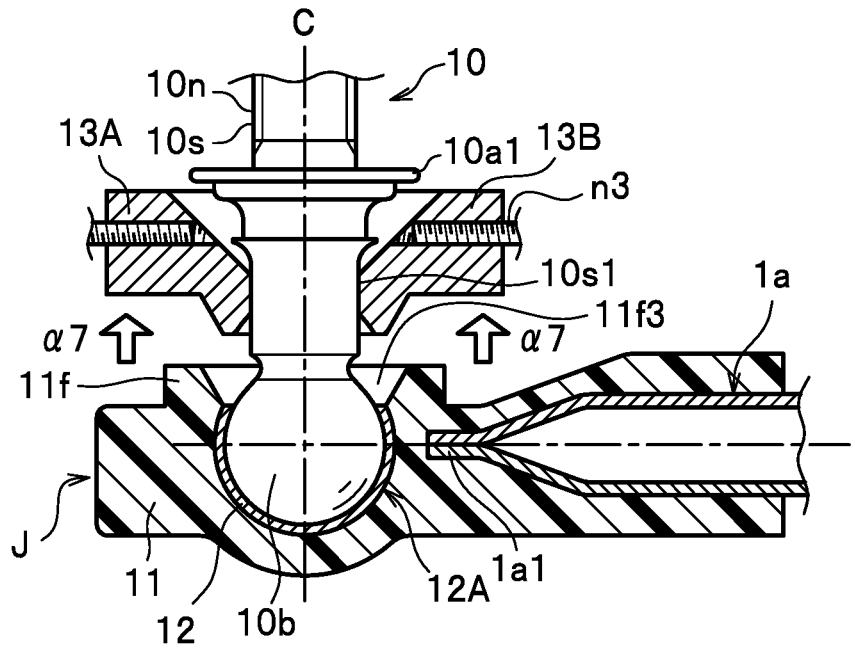
FIG. 11A is a partial sectional side view showing another example of the process for detaching the first divided inner piece and the second divided inner piece after the insert molding of the outer housing.
Figure 11B:
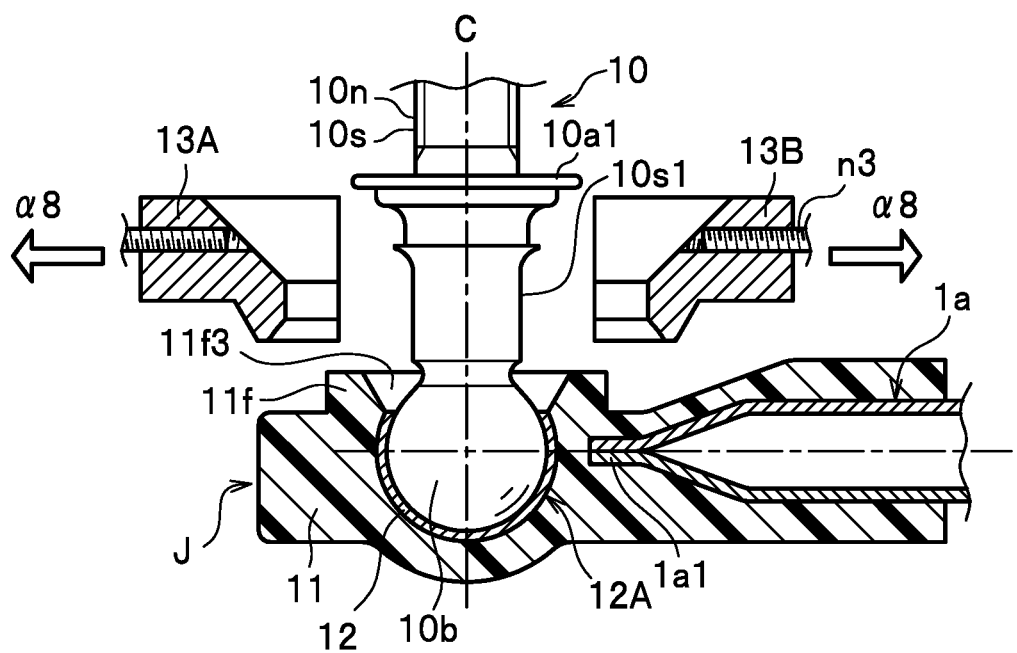
FIG. 11B is a partial sectional side view showing the other example of the process for detaching the first divided inner piece and the second divided inner piece after the insert molding of the outer housing.

FIG. 10 is an exterior view showing the ball stud, the straight section of which is relatively long. FIG. 11A and FIG. 11B are partial sectional side views showing another example of the process for detaching the first divided inner piece and the second divided inner piece after the insert molding of the outer housing.

As shown in FIG. 10, when the length s1 of the straight section 10s1 of the ball stud 10 can be formed relatively large, after the insert molding of the outer housing 11, the first divided inner piece 13A and the second divided inner piece 13B can be detached by the vertical direction movement and the horizontal direction movement without being rotated as shown in FIG. 9A to FIG. 9D (see an arrow α7 in FIG. 11A and an arrow α8 in FIG. 11A).

Specifically, first, the screws (not shown in the figures) for fixing the first divided inner piece 13A and the second divided inner piece 13B are loosened and removed. The locking screws n3 screwed in the female screw sections 13a8 and 13b8 are loosened to retract into the first and second divided inner pieces 13A and 13B.

Subsequently, as indicated by an arrow α7 in FIG. 11A, the first divided inner piece 13A and the second divided inner piece 13B are released from a contact state with the outer housing 11 in the direction on the stud section 10s side along the straight section 10s1 of the ball stud 10.

In detail, the first divided inner piece 13A and the second divided inner piece 13B are respectively moved upward along the straight section 10s1 to a position where the flange insertion sections 13a7 and 13b7 move out from the inside of the convex flange 11f of the outer housing 11 and the first and second divided inner pieces 13A and 13B do not come into contact with the small brim 10a2.

Thereafter, as indicated by an arrow α8 in FIG. 11B, the first divided inner piece 13A and the second divided inner piece 13B are moved in a direction separating from the axis C of the ball stud 10 and detached. That is, the first divided inner piece 13A and the second divided inner piece 13B are detached by combining movement of the stud section 10s in a direction of the other end portion on the counter ball section 10b side and separation of the stud section 10s from the center axis C.

According to the process explained above, when the straight section 10s1 continuing to the ball section 10b of the ball stud 10 is long, the outer housing 11 including the taper section 11f1 having a recessed shape in the opening section 11f3 can be molded.

Note that the divided inner piece 13 having the configuration of the two divided inner pieces is illustrated above. However, the divided inner piece 13 may have a configuration of three or more divided inner pieces. In the case of the configuration of the three or more divided inner pieces, a circumferential length of a divided mold is reduced because the number of divisions of an annular shape of the divided inner piece 13 increases. Therefore, as indicated by the arrows a3 to a6 in FIG. 9A to FIG. 9D, a rotation angle in rotating and detaching the divided inner piece 13 can be reduced. Therefore, it is easy to detach the divided inner piece 13 after the molding of the outer housing 11.

On the other hand, when the number of divisions of the divided inner piece 13 increases, more divided molds are handled. Therefore, it is difficult to handle the divided inner piece 13. In that sense, the number of divisions of the divided inner piece 13 is suitably two to four. Note that the number of divisions is most advantageously two when handleability and the like are comprehensively taken into account.

<Attachment of the Dust Cover 13>

Thereafter, as shown in FIG. 1, a part near the iron link 13a of the lower end circumferential portion of the dust cover 13 is pressed into and fixed in the recessed section 110 around the convex flange section 11f in the upper part of the outer housing 11. On the other hand, the upper end circumferential portion of the dust cover 13 is fit into the circumferential recessed section 10e between the brim section 10a1 and the small brim section 10s2 of the ball stud 10. Consequently, the dust cover 13 is fixed to the convex flange section 11f of the outer housing 11 and the ball stud 10.

Figure 12:
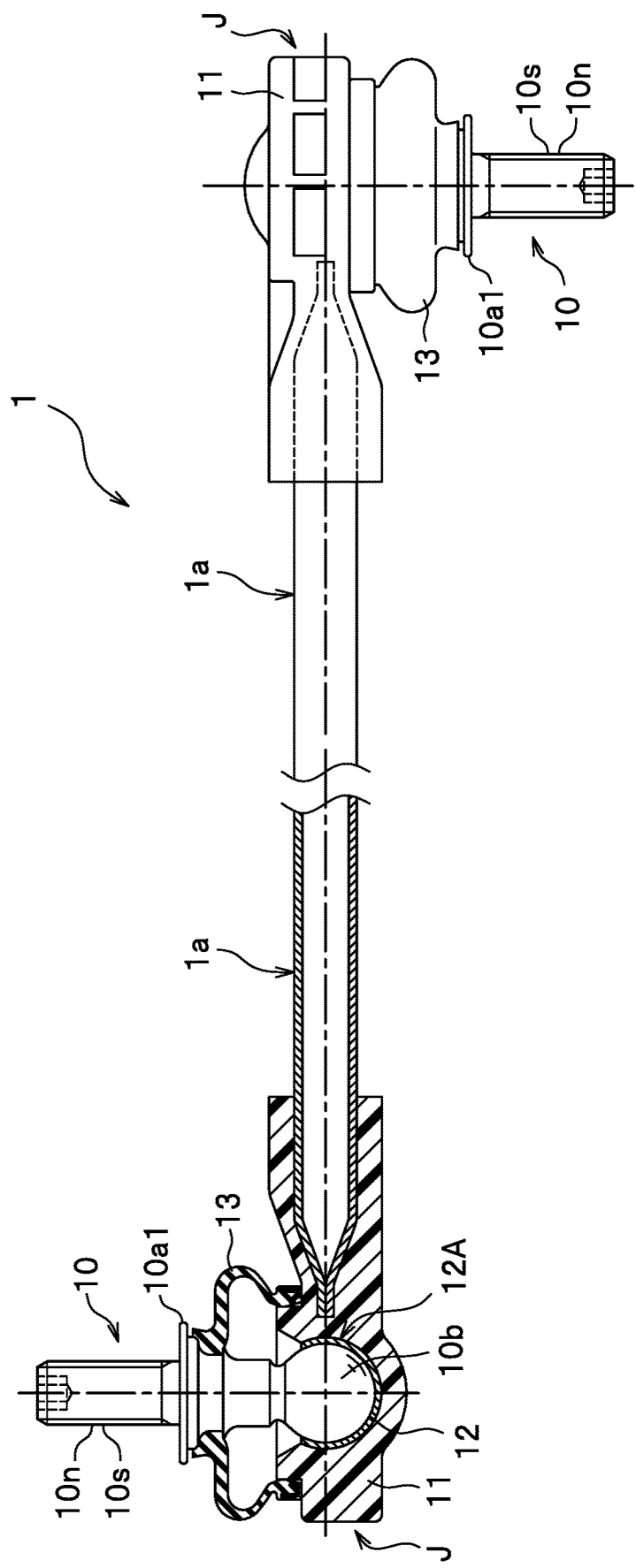
FIG. 12 is a partial sectional exterior view showing a stabilizer link of the first embodiment.

According to the above process, the ball joint J shown in FIG. 1 is completed and the stabilizer link 1 (see FIG. 12) is assembled. FIG. 12 is a partial sectional exterior view showing the stabilizer link of the first embodiment.

With the configuration explained above, effects explained below are achieved.

1. The ball seat 12 is molded by the insert molding using, as a core, the ball section 10b of the ball stud 10. The outer housing 11 is molded by the insert molding using, as a core, the ball section 10b, around which the ball seat 12 is formed, and the distal end portion 1a1 of the support bar 1a and using the divided inner piece 13 (13A and 13B) and the like.

In detail, after the formation of the outer housing 11, the first divided inner piece 13A and the second divided inner piece 13B of the divided structure are separated from the ball section 10b along the straight section 10s1 of the ball stud 10. The portion located near the distal end of the stud 10s is rotated outward and detached (see FIG. 9A to FIG. 9D).

Consequently, even when the length s1 of the straight section 10s1 is small, it is possible to manufacture, with the insert molding, the outer housing 11, from which the convex flange section 11f protrudes upward, using, as a core, the ball section 10b, on which the ball seat 12 is formed, of the ball stud 10 integrally provided with the stud section 10s in advance and the distal end portion 1a1 of the support bar 1a.

2. Therefore, the conventional process for joining the ball section and the stud section with the resistance welding described in Patent Literature 2 is unnecessary. Therefore, it is unnecessary to provide a hole in the bottom of the outer housing. That is, it is possible to mold the outer housing 11 without forming the opening section 11f3 except an opening through which the stud section 10s is inserted.

It is unnecessary to close the hole present in the bottom of the outer housing with the lid member after the resistance welding.

Therefore, it is possible to reduce manufacturing man-hours for the ball joint J.

Figure 16:
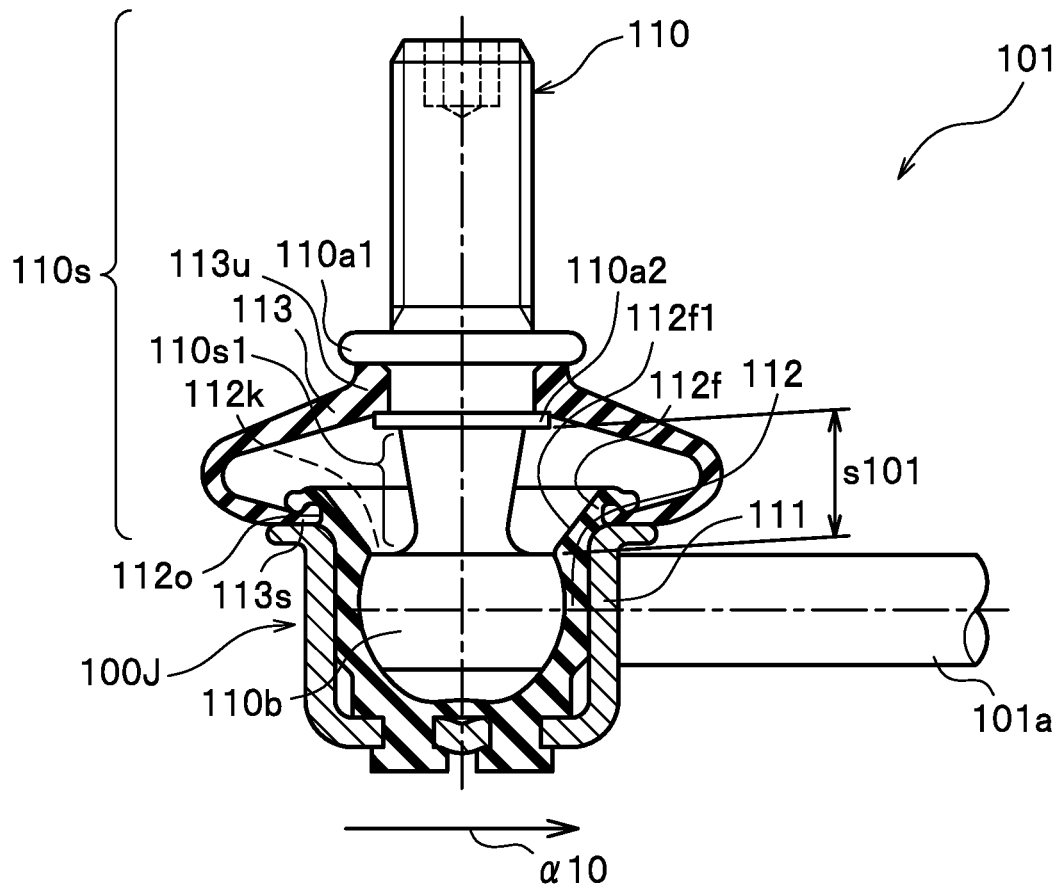
FIG. 16 is a partial sectional view showing a periphery of a conventional ball joint.

3. The ball seat 12 and the outer housing 11 can be resin-molded continuously to the ball section 10b. Therefore, the ball section 10b and the ball seat 12 adhere and the spherical surfaces coincide. Therefore, it is possible to realize the ball joint J with which a stable behavior without a backlash can be obtained. Therefore, the mold adjustment for the housing 111, the ball seat 112, and the like performed in the conventional ball joint 100J shown in FIG. 16 is unnecessary.

4. A series of processes for manufacturing the conventional ball joint 100J can be realized by repeating the insert molding. A reduction in assembly man-hours for the ball joint J can be achieved. Therefore, productivity of the ball joint J is improved.

A reduction in assembly man-hours for the stabilizer link 1 including the ball joint J can be achieved. Productivity of the stabilizer link 1 is improved.

5. A combined structure without a gap between the ball section 10b of the ball stud 10 and the ball seat 12 and between the ball seat 12 and the outer housing 11 can be obtained. Therefore, it is possible to obtain the ball joint J in which the ball section 10b of the ball stud 10 can smoothly swing and rotate without a backlash with respect to the ball seat 12.

6. According to the above description, it is possible to realize the ball joint J easy to manufacture and having high accuracy and the stabilizer link 1 including the ball joint J. It is possible to realize the stabilizer link 1 having high productivity and with which a stale behavior without a backlash can be obtained.

Second Embodiment

Figure 13:
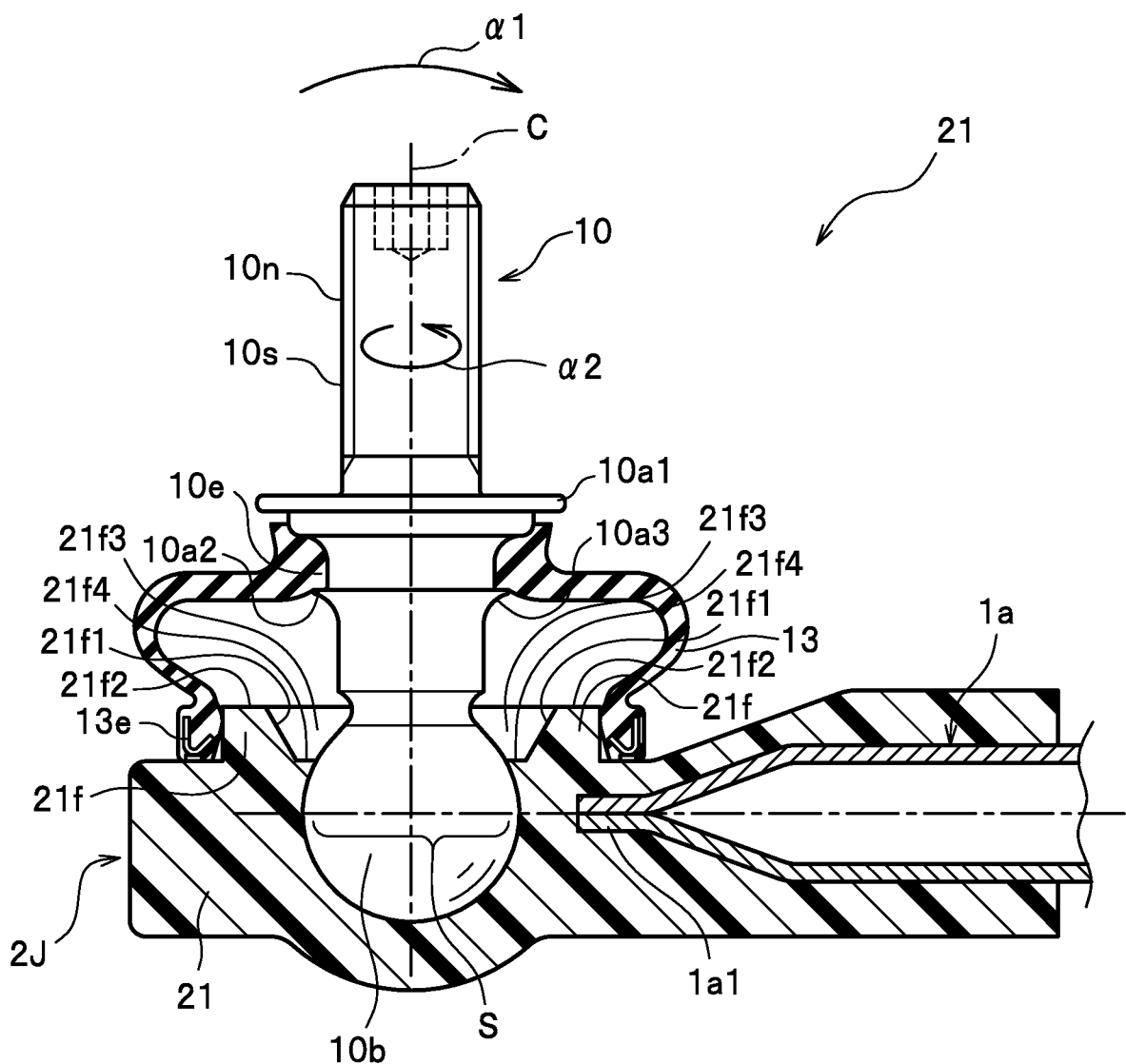
FIG. 13 is a longitudinal sectional view of a ball joint of a stabilizer link of a second embodiment according to the present invention.

FIG. 13 is a longitudinal sectional view of a ball joint of a stabilizer link of a second embodiment according to the present invention.

A ball joint 2J of the stabilizer link of the second embodiment has a configuration in which the ball section 10b of the ball stud 10 is directly covered with an outer housing 21.

The other components are the same as the components in the first embodiment. Therefore, the same components are denoted by the same reference numerals and signs. The outer housing and components of the outer housing are denoted by 20's numbers and shown. Detailed explanation of the components is omitted.

In the ball joint 2J of the second embodiment, the outer housing 21 is formed in the part of the ball seat 12 of the first embodiment. The outer housing 21 is resin-molded adjacent to the ball section 10b of the ball stud 10.

Consequently, in the outer housing 21, an annular horizontal section 21f4 is formed continuously to the inside in a conical taper section 21f1 of a convex flange 21f.

In detail, in the outer housing 21, an opening section 21f3, through which a near part of the stud section 10s of the ball section 10b is inserted, is formed. In the outer housing 21, near the stud section 10s connected to the ball section 10b, a conical taper section 21f1 having a recessed shape widening toward the stud section 10s is formed in the opening section 21f3. An annular horizontal section 21f4 is formed continuously to the taper section 21f1.

A method for manufacturing the ball joint 2J is explained.

After the ball stud 10 is manufactured in the same manner as in the first embodiment, the outer housing 21 is insert-molded as explained below using, as a core, the ball section 10b of the ball stud 10 and the distal end portion 1a1 of the support bar 1a.

Figure 14A:
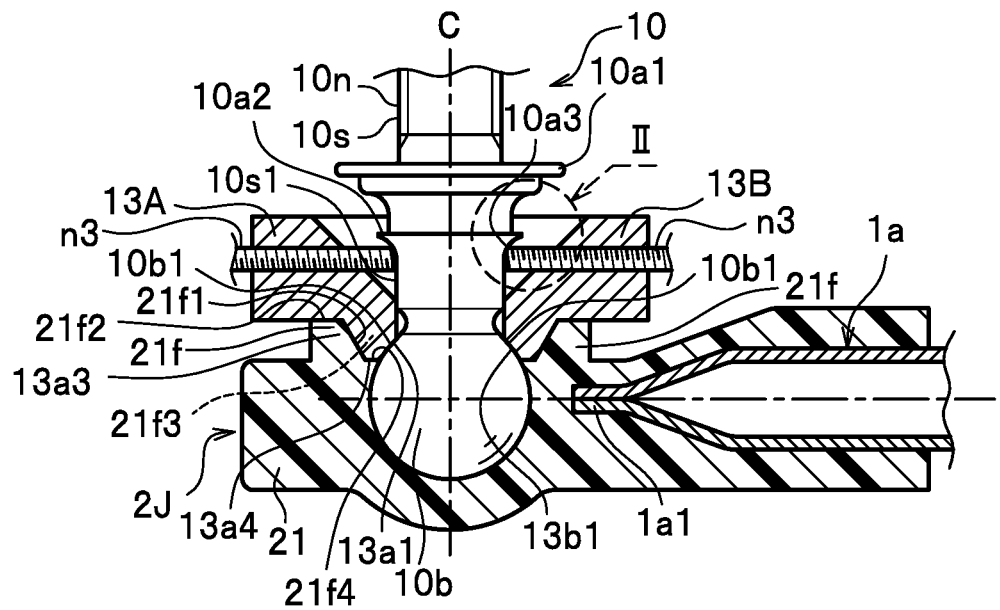
FIG. 14A is a partial sectional view showing a state immediately after an outer housing of the ball joint of the second embodiment is insert-molded using, as a core, a ball section of a ball stud and a distal end portion of a support bar.
Figure 14B:
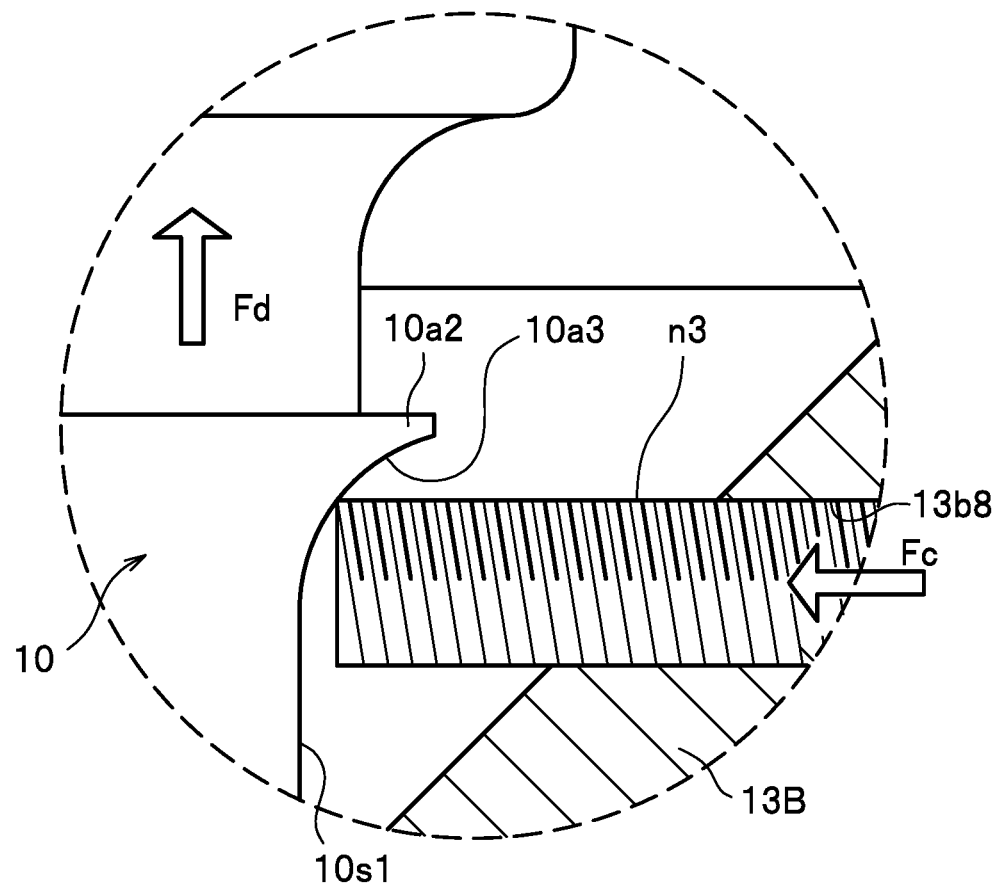
FIG. 14B is an enlarged view of a II part in FIG. 14A.

FIG. 14A is a partial sectional view showing a state immediately after the outer housing of the ball joint of the second embodiment is insert-molded using, as a core, the ball section of the ball stud and the distal end portion of the support bar. FIG. 14B is an enlarged view of a II part in FIG. 14A.

In molding the outer housing 21, it is necessary to prevent resin forming the outer housing 21 from leaking to the straight section 10s1 of the ball stud and the upper spherical surface section 10b1 of the ball section 10b.

As explained above, the length s1 (see FIG. 1) of the straight section 10s1 of the ball stud 10 is desirably small.

Because of the above reason, when the outer housing 21 is insert-molded, the divided inner piece 13 (see FIG. 6) having the half-divided shape explained in the first embodiment can be used.

As shown in FIG. 14A, the first divided inner piece 13A and the second divided inner piece 13B are closely attached to the straight section 10s1 of the boll stud 10 and the upper spherical surface section 10b1 of the ball section 10b near the straight section 10s1.

The first flange contact surface 13a3 and the first ball seat contact surface 13a4 of the first divided inner piece 13A (see FIG. 7A) respectively form the taper section 21f1, an upper surface section 21f2, and the horizontal section 21f4 of the convex flange 21f of the outer housing 21. The second flange contact surface 13b3 and the second ball seat contact surface 13b4 of the second divided inner piece 13B (see FIG. 8A) respectively form the taper section 21f1, the upper surface section 21f2, and the horizontal section 21f4 of the convex flange 21f of the outer housing 21.

The other parts of the outer housing 21 are formed in the same manner as in the first embodiment.

In the insert molding of the outer housing 21, as in the first embodiment, the first inner spherical surface 13a1 (see FIG. 7A) of the first divided inner piece 13A and the second inner spherical surface 13b1 (see FIG. 8A) of the second divided inner piece 13B shown in FIG. 14A are set in a state of adhesion to the upper spherical surface section 10b1 of the ball section 10b.

Specifically, as shown in FIG. 14B, the locking screws n3 screwed in the female screw sections 13a8 and 13b8 of the first and second divided inner pieces 13A and 13B are tightened. The R section 10a3 of the ball stud 10 is pushed in the horizontal direction by the distal end portions of the locking screws n3. Consequently, the R section 10a3 of the ball stud 10 receives an upward force (a force Fd in FIG. 14B) as a triangular component force. The ball stud 10 moves upward. The upper spherical surface section 10b1 of the ball section 10b is set in a state of adhesion to the first inner spherical surface 13a1 of the first divided inner piece 13A and the second inner spherical surface 13b1 of the second divided inner piece 13B.

Consequently, the first inner spherical surface 13a1 of the first divided inner piece 13A and the second inner spherical surface 13b1 of the second divided inner piece 13B respectively adhere to the upper spherical surface section 10b1 of the ball section 10b. Therefore, resin forming the outer housing 21 is prevented from leaking to the upper spherical surface section 10b1 of the ball section 10b.

Note that, as explained in the first embodiment, the locking screws n3 of closely attaching means for closely attaching the first inner spherical surface 13a1 of the first dividing inner piece 13A and the second inner spherical surface 13b1 of the second divided inner piece 13B to the ball section 10b may be substituted by other closely attaching means such as cams or air cylinders.

In this way, as in the first embodiment, as shown in FIG. 14A, the outer housing 21 is insert-molded using, as a core, the ball section 10b of the ball stud 10 and the distal end portion 1a1 of the support bar 1a and using the not-shown main mold and the first and second divided inner pieces 13A and 13B.

After the molding, the screws for fixing are removed. The locking screws n3 are retracted into the first and second divided inner pieces 13A and 13B.

When the length s1 (see FIG. 1) of the straight section 10s1 of the ball stud 10 is small, in the same manner as shown in FIG. 9A to FIG. 9D, while the first divided inner piece 13A and the second divided inner piece 13B are gradually lifted in the direction on the stud section 10s side from the state shown in FIG. 14A, the portion located near the distal end of the stud section 10s in the upper part is rotated outward, whereby the first divided inner piece 13A and the second divided inner piece 13B are detached. Consequently, even when the stud section 10s of the ball stud 10 is short, the outer housing 21 including the taper section 21f1 having a recessed shape in the opening section 21f3 can be molded.

On the other hand, when the length s1 of the straight section 10s1 of the ball stud 10 is large (see FIG. 10), in the same manner as shown in FIG. 11A and FIG. 11B, after being moved in the direction on the stud section 10s side (see FIG. 1) along the straight section 10s1 of the ball stud 10 from the state shown in FIG. 14, the first and second divided inner pieces 13A and 13B are moved toward a direction separating from the axis C of the ball stud 10 and detached. That is, the first and second divided inner pieces 13A and 13B are detached by combining movement of the stud section 10s in the direction of the other end portion on the counter ball section 10b side and separation of the stud section 10s from the center axis C. Consequently, when the straight section 10s1 continuing to the ball section 10b of the ball stud 10 is long, the outer housing 21 including the taper section 21f1 having a recessed shape in the opening section 21f3 can be molded.

With the configuration explained above, effects explained below are achieved.

1. The outer housing 21 is insert-molded using, as a core, the ball section 10b, in which the stud section 10s is provided in advance, and the distal end portion 1a1 of the support bar 1a.

That is, the outer housing 21 can be resin-molded around the ball section 10b of the ball stud 10 using the ball stud 10 in which the ball section 10b is formed in advance. Therefore, it is possible to mold the outer housing 21 without forming the opening section 21f3 except an opening through which the stud section 10s is inserted. It is possible to realize the ball joint 2J with which a stable behavior without a backlash can be obtained.

2. Because the ball seat 12 of the first embodiment is absent, the manufacturing process for the ball seat 12 is eliminated.

3. Therefore, manufacturing man-hours for the ball joint 2J and the stabilizer link 1 including the ball joint 2J decreases. Therefore, productivity of the ball joint 2J and the stabilizer link 1 is improved.

4. Even when the length s1 (see FIG. 1) of the straight section 10s1 of the ball stud 10 is small, by using the first and second divided inner pieces 13A and 13B, it is possible to insert-mold the outer housing 21 including the convex flange 21f having a shape projecting outward using, as a core, the ball section 10b of the ball stud 10.

Modification 1

Figure 15:
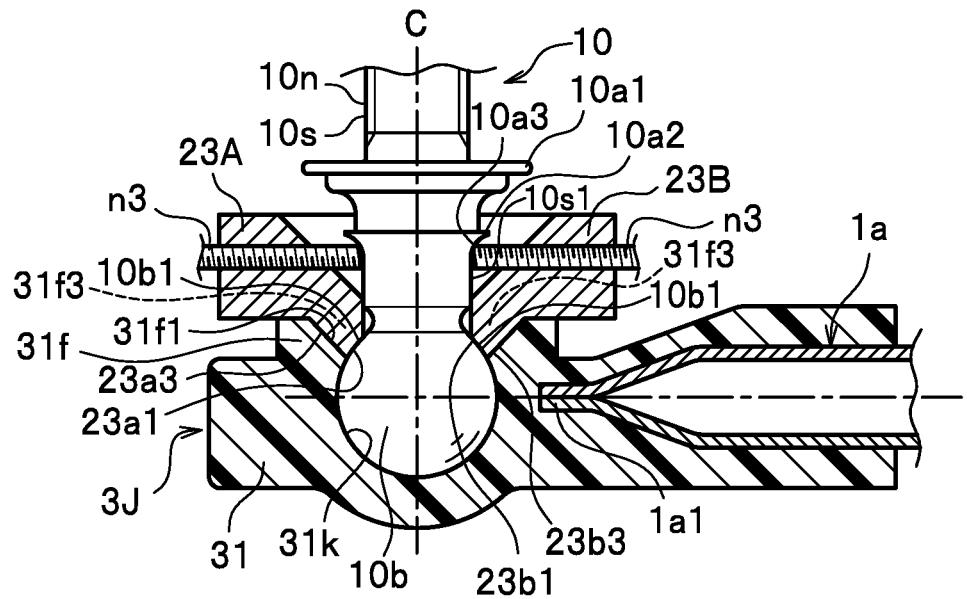
FIG. 15 is a partial sectional view showing a state immediately after an outer housing of a ball joint of a modification 1 of the second embodiment is insert-molded using, as a core, a ball section of a ball stud and a distal end portion of a support bar.

FIG. 15 is a partial sectional view showing a state immediately after an outer housing of a ball joint of a modification 1 of the second embodiment is insert-molded using, as a core, a ball section of a ball stud and a distal end portion of a support bar.

A ball joint 3J of the modification 1 has a configuration in which the ball joint 3J is formed by extending a taper section 31f1 of a convex flange 31f of an outer housing 31 and the horizontal section 21f4 (see FIG. 13) is not formed.

The other components are the same as the components in the first embodiment. Therefore, the same components are denoted by the same reference numerals and signs. Components of the outer housing are denoted by 30's numbers and shown. Detailed explanation of the components is omitted.

In the ball joint 3J of the modification 1, the conical taper section 31f1 of the convex flange 31f of the outer housing 31 is continuously formed to a spherical surface section 31k of the outer housing 31. In the outer housing 31, an opening section 31f3, through which a near part of the stud section 10s of the ball section 10b is inserted, is formed.

Near the stud section 10s connected to the ball section 10b, a conical taper section 31f1 having a recessed shape widening toward the stud section 10s is formed in the opening section 31f3.

Therefore, in the ball joint 3J, first and second divided inner pieces 23A and 23B shown in FIG. 15 are used.

In the first divided inner piece 23A, the first ball seat contact surface 13a4 (see FIG. 7A) of the first divided inner piece 13A of the first embodiment is absent. A first taper contact surface 23a3 is continuously formed on a first inner spherical surface 23a1. The other components are the same as the components of the first divided inner piece 13A of the first embodiment.

In the second divided inner piece 23B, the second ball seat contact surface 13b4 (see FIG. 8A) of the first divided inner piece 13B of the first embodiment is absent. A second taper contact surface 23b3 is formed continuously to a second inner spherical surface 23b1. The other components are the same as the components of the second divided inner piece 13B of the first embodiment.

When the outer housing 31 of the modification 1 is insert-molded using, as a core, the ball section 10b of the ball stud 10 and the distal end portion 1a1 of the support bar 1a, as in the second embodiment, the insert molding is performed by closely attaching, using the locking screws n3 or the like, the first divided inner piece 23A and the second divided inner piece 23B respectively to the ball section 10b of the ball stud 10.

According to the modification 1, it is possible to form the outer housing 31 including the convex flange 31f in which the taper section 31f1 is formed continuously to the spherical surface section 31k of the outer housing 31.

Besides, the modification 1 achieves the same operational effects as the operational effects in the first and second embodiments.

Other Embodiments

1. In the explanation of the first and second embodiments, the modification 1, and the like, the stabilizer link 1 includes the ball joints J to 3J on both the side of the stabilizer link 1. However, the stabilizer link 1 may include the ball joints J to 3J only on either one side of the stabilizer link 1. Alternatively, the stabilizer link 1 may include any one of the ball joints J to 3J on either one side of the stabilizer link and includes any one of the ball joins J to 3J on the other side.

2. In the first and second embodiments, the modification 1, and the like, the various configurations are explained. However, the configurations may be combined as appropriate.

3. The configurations explained in the first and second embodiments and the like indicate examples of the present invention. Various modified forms and specific forms are possible in a range not departing from the spirit of the present invention described in the claims.

Note that the ball joint of the invention can be widely applied to joint portions of robot arms of, for example, an industrial robot used for automation of manufacturing, FA (Factory Automation), and the like and a humanoid robot applied to medical treatment, a nuclear power plant, and the like, a device in which an arm rotates in a joint portion in an industrial vehicle such as a shovel car or a crane, and a structure of a joint portion between other machine elements, for example, between a link and an arm.

REFERENCE SIGNS LIST

1: stabilizer link
1a: support bar
2: stabilizer
3: suspension
10: ball stud
10b: ball section
10s: stud section
11, 21, 31: outer housing (housing)
11f1, 21f1, 31f1: taper section
11f3, 21f3, 31f3: opening section
12: ball seat
12A: ball seat assembly
13A, 23A: first divided inner piece (divided inner piece)
13B, 23B: second divided inner piece (divided inner piece)
21f4: horizontal section (recessed shape)
C: axis (center line)
J, 2J, 3J: ball joint
K1: first molding die
K1g: gate
K2: second molding die

The invention claimed is:

1. A method for manufacturing a ball joint comprising:
a ball-seat molding step for forming a ball seat assembly by using, as a core, a ball section of a ball stud, the ball section of which is integrally provided in advance at one end portion of a stud section, and insert-molding a ball seat made of resin to cover at least a portion of the ball section present on an opposite side to the stud section, and
a housing molding step for insert-molding a housing made of resin by using, as a core, the ball section partially covered by the ball seat of the ball seat assembly, wherein in the housing molding step, the housing includes, in an opening section, a taper section having a recessed shape widening toward another end portion of the stud section, and
the housing molding step includes:
an inner-piece disposing step for disposing a divided inner piece, which forms the taper section, such that the divided inner piece comes into contact with a part exposed from the ball seat of the ball section present on one end portion side of the stud section;
an inner-piece contacting step for closely contacting an inner spherical surface of the divided inner piece to the part exposed from the ball seat of the ball section by pushing an inclined surface opposite to the ball section of the ball stud with locking screws passing through the divided inner piece such that the ball stud is moved upward;
a step for insert-molding the housing; and
an inner-piece detaching step for, while moving the divided inner piece in a direction of the other end portion of the stud section, rotating the divided inner piece to separate a portion of the divided inner piece located on the other end portion side of the stud section from the stud section and detaching the divided inner piece.

2. A method for manufacturing a stabilizer link including a bar-shaped support bar and the ball joint according to claim 1 provided at an end portion of the support bar, for coupling a suspension and a stabilizer of a vehicle, wherein in the housing molding step in the method for manufacturing a ball joint according to claim 1, the housing is insert-molded using, as a core, at least any end portion in a longitudinal direction of the support bar.

3. The method for manufacturing a ball joint according to claim 1, wherein the ball-seat molding step includes:
discharging resin for molding the ball seat from a gate of a first molding die provided on an opposite side of the ball section to the stud section; and
pressing and closely attaching the ball section to a second molding die disposed on the stud section side with a discharge pressure of the resin.

4. A method for manufacturing a stabilizer link including a bar-shaped support bar and a ball joint manufactured according to claim 3 provided at an end portion of the support bar, for coupling a suspension and a stabilizer of a vehicle, wherein
in the housing molding step in the method for manufacturing a ball joint according to claim 3, the housing is insert-molded using, as a core, at least any end portion in a longitudinal direction of the support bar.

5. A method for manufacturing a ball joint comprising:
a housing molding step for insert-molding a housing made of resin, by using, as a core, a ball section of a ball stud, the ball section of which is integrally provided in advance at one end portion of a stud section, to cover at least a portion of the ball section present on an opposite side to the stud section wherein, in the housing molding step, the housing includes, in an opening section, a taper section having a recessed shape widening toward another end portion of the stud section, and
the housing molding step includes:
an inner-piece disposing step for disposing a divided inner piece, which forms the taper section, such that the divided inner piece comes into contact with a part of the ball section near one end portion of the stud section;
an inner-piece contacting step for closely contacting an inner spherical surface of the divided inner piece to a part at a stud section side of the ball section by pushing an inclined surface opposite to the ball section of the ball stud with locking screws passing through the divided inner piece such that the ball stud is moved upward;
a step for insert-molding the housing; and
an inner-piece detaching step for, while moving the divided inner piece in a direction of the other end portion of the stud section, rotating the divided inner piece to separate a portion of the divided inner piece located on the other end portion side of the stud section from the stud section and detaching the divided inner piece.

6. A method for manufacturing a stabilizer link including a bar-shaped support bar and the ball joint according to claim 5 provided at an end portion of the support bar, for coupling a suspension and a stabilizer of a vehicle, wherein
in the housing molding step in the method for manufacturing a ball joint according to claim 5, the housing is insert-molded using, as a core, at least any end portion in a longitudinal direction of the support bar.

7. A method for manufacturing a ball joint comprising:
a ball-seat molding step for forming a ball seat assembly by using, as a core, a ball section of a ball stud, the ball section of which is integrally provided in advance at one end portion of a stud section, and insert-molding a ball seat made of resin to cover at least a portion of the ball section present on an opposite side to the stud section, and
a housing molding step for insert-molding a housing made of resin by using, as a core, the ball section partially covered by the ball seat of the ball seat assembly, wherein, in the housing molding step, the housing includes, in an opening section, a taper section having a recessed shape widening toward another end portion of the stud section, and
the housing molding step includes:
an inner-piece disposing step for disposing a divided inner piece, which forms the taper section, such that the divided inner piece comes into contact with a part exposed from the ball seat of the ball section present on one end portion side of the stud section;
an inner-piece contacting step for closely contacting an inner spherical surface of the divided inner piece to the part exposed from the ball seat of the ball section by pushing an inclined surface opposite to the ball section of the ball stud with locking screws passing through the divided inner piece such that the ball stud is moved upward;
a step for insert-molding the housing; and
an inner-piece detaching step for detaching the divided inner piece by combining movement in a direction of the other end portion of the stud section and separation from an axis of the stud section.

8. A method for manufacturing a stabilizer link including a bar-shaped support bar and a ball joint manufactured according to claim 7 provided at an end portion of the support bar, for coupling a suspension and a stabilizer of a vehicle, wherein
in the housing molding step in the method for manufacturing a ball joint according to claim 7, the housing is insert-molded using, as a core, at least any end portion in a longitudinal direction of the support bar.

9. The method for manufacturing a ball joint according to claim 7, wherein the ball-seat molding step includes:
discharging resin for molding the ball seat from a gate of a first molding die provided on an opposite side of the ball section to the stud section; and
pressing and closely attaching the ball section to a second molding die disposed on the stud section side with a discharge pressure of the resin.

10. A method for manufacturing a stabilizer link including a bar-shaped support bar and a ball joint manufactured according to claim 9 provided at an end portion of the support bar, for coupling a suspension and a stabilizer of a vehicle, wherein
in the housing molding step in the method for manufacturing a ball joint according to claim 9, the housing is insert-molded using, as a core, at least any end portion in a longitudinal direction of the support bar.

11. A method for manufacturing a ball joint comprising:
a housing molding step for insert-molding a housing made of resin, by using, as a core, a ball section of a ball stud, the ball section of which is integrally provided in advance at one end portion of a stud section, to cover at least a portion of the ball section present on an opposite side to the stud section, wherein, in the housing molding step, the housing includes, in an opening section, a taper section having a recessed shape widening toward another end portion of the stud section, and the housing molding step includes:

an inner-piece disposing step for disposing a divided inner piece, which forms the taper section, such that the divided inner piece comes into contact with a part of the ball section near one end portion side of the stud section;

an inner-piece contacting step for closely contacting an inner spherical surface of the divided inner piece to a part at a stud section side of the ball section by pushing an inclined surface opposite to the ball section of the ball stud with locking screws passing through the divided inner piece such that the ball stud is moved to upward;

a step for insert-molding the housing; and an inner-piece detaching step for detaching the divided inner piece by combining movement in a direction of the other end portion of the stud section and separation from an axis of the stud section.

12. A method for manufacturing a stabilizer link including a bar-shaped support bar and a ball joint manufactured according to claim 11 provided at an end portion of the support bar, for coupling a suspension and a stabilizer of a vehicle, wherein in the housing molding step in the method for manufacturing a ball joint according to claim 11, the housing is insert-molded using, as a core, at least any end portion in a longitudinal direction of the support bar.

* * * * *